(12) United States Patent
Schantz et al.

(10) Patent No.: US 8,018,383 B1
(45) Date of Patent: Sep. 13, 2011

(54) METHOD AND APPARATUS FOR DETERMINING LOCATION USING SIGNALS-OF-OPPORTUNITY

(75) Inventors: Hans Gregory Schantz, Huntsville, AL (US); Alfred Hans Unden, Owens Cross Roads, AL (US); Eric Richards, Madison, AL (US); Robert Edward Depierre, Huntsville, AL (US)

(73) Assignee: Q-Track Corporation, Huntsville, AL (US)

( * ) Notice: Subject to any disclaimer, the term of this patent is extended or adjusted under 35 U.S.C. 154(b) by 0 days.

(21) Appl. No.: 12/796,643

(22) Filed: Jun. 8, 2010

(51) Int. Cl.
*G01S 3/02* (2006.01)
(52) U.S. Cl. .................................................. 342/453
(58) Field of Classification Search .................. 342/453
See application file for complete search history.

(56) References Cited

U.S. PATENT DOCUMENTS

| | | | |
|---|---|---|---|
| 716,134 A | 12/1902 | Stone | |
| 749,436 A | 1/1904 | De Forest | |
| 758,517 A | 4/1904 | De Forest | |
| 1,183,802 A | 5/1916 | De Forest | |
| 2,884,628 A | 4/1959 | Loomis | |
| 5,510,801 A | 4/1996 | Engelbrecht | |
| 5,977,913 A | 11/1999 | Christ | |
| 6,011,515 A * | 1/2000 | Radcliffe et al. | 342/453 |
| 6,026,304 A | 2/2000 | Hilsenrath | |
| 6,064,339 A | 5/2000 | Wax | |
| 6,104,344 A | 8/2000 | Wax | |
| 6,108,447 A | 8/2000 | Wax | |
| 6,108,557 A | 8/2000 | Wax | |
| 6,112,095 A | 8/2000 | Wax | |
| 6,154,657 A | 11/2000 | Grubeck | |
| 6,230,000 B1 | 5/2001 | Tayloe | |
| 6,249,680 B1 | 6/2001 | Wax | |
| 6,282,426 B1 | 8/2001 | Wang | |
| 6,456,239 B1 | 9/2002 | Werb | |
| 6,496,701 B1 | 12/2002 | Chen | |
| 6,559,800 B2 | 5/2003 | Rabinowitz | |
| 6,608,593 B2 * | 8/2003 | Holt | 342/453 |
| 6,674,403 B2 | 1/2004 | Gray | |
| 6,691,074 B1 | 2/2004 | Moriya | |
| 6,727,847 B2 | 4/2004 | Rabinowitz | |
| 6,879,286 B2 | 4/2005 | Rabinowitz | |
| 6,963,301 B2 | 11/2005 | Schantz | |
| 6,963,727 B2 * | 11/2005 | Shreve | 455/39 |
| 7,043,999 B2 | 5/2006 | Bernhard | |

(Continued)

OTHER PUBLICATIONS

Fisher—"The Navigation Potential of Signals of Opportunity-Based Time Difference of Arrival Measurements", Air Force Institute of Technology (2005).

(Continued)

*Primary Examiner* — Thomas H Tarcza
*Assistant Examiner* — Frank McGue
(74) *Attorney, Agent, or Firm* — Mark P Kahler

(57) ABSTRACT

A signal-of-opportunity location device (SOLD) that may be situated in a complex radio propagation environment with multiple RF signal obstructions receives RF signals from a distant transmitter. The RF signals from the distant transmitter interact with obstructions in the propagation environment local to the SOLD. The local obstructions perturb the RF signals causing the RF signals to exhibit near field behavior in the complex radio propagation environment. The SOLD receives the locally perturbed signals. The SOLD detects signal characteristics of RF signal components of the received signals and compares these signal characteristics with reference data in a reference data store to determine the current location of the SOLD.

46 Claims, 16 Drawing Sheets

U.S. PATENT DOCUMENTS

| | | | |
|---|---|---|---|
| 7,298,314 B2 | 11/2007 | Schantz | |
| 7,307,595 B2 | 12/2007 | Schantz | |
| 7,414,571 B2 | 8/2008 | Schantz | |
| 7,538,715 B2 | 5/2009 | Langford | |
| 7,592,949 B2 | 9/2009 | Schantz | |
| 7,593,740 B2 | 9/2009 | Crowley | |
| 7,609,164 B2 | 10/2009 | Yamashita | |
| 7,782,256 B2* | 8/2010 | Smith | 342/453 |
| 7,809,805 B2 | 10/2010 | Stremel | |
| 7,859,452 B2 | 12/2010 | Schantz | |
| 2002/0196188 A1* | 12/2002 | Holt | 342/453 |
| 2004/0032363 A1* | 2/2004 | Schantz et al. | 342/127 |
| 2005/0046608 A1* | 3/2005 | Schantz et al. | 342/127 |
| 2006/0244673 A1 | 11/2006 | Schantz | |
| 2007/0282482 A1 | 12/2007 | Schantz | |
| 2008/0241805 A1 | 10/2008 | Schantz | |
| 2009/0146864 A1 | 6/2009 | Zank | |
| 2009/0280742 A1 | 11/2009 | Schantz | |

OTHER PUBLICATIONS

Hall—"Radiolocation Using AM Broadcast Signals: The Role of Signal Propagation Irregularities", MIT Lincoln Laboratory, Lexington, MA, IEEE (2004).

Hertz—"Electric Waves", London: Macmillan and Company, p. 152 (1893).

Jenkins—"Small-Aperture Radio Direction-Finding", Artech House, Boston, pp. 1-23 (1991).

McEllroy—"Opportunistic Navigation: Finding Your Way With AM Signals of Opportunity", GPS World (2007).

Schantz—"Near Field Phase Behavior", IEEE Antennas and Propagation Society International Symposium, Washington, DC, USA; vol. 3B, pp. 134-137 (2005).

Schantz—"A Near Field Propagation Law & A Novel Fundamental Limit to Antenna Gain Versus Size", IEEE Antennas and Propagation Society International Symposium, Washington, DC, USA; vol. 3A, pp. 237-240 (2005).

Shantz—"On the Origins of RF-Based Location," Submitted to 2010 IEEE Symposium on RFID; Orlando, FL; (Apr. 14-15, 2010).

Yan—"Asynchronous Differential TDOA for Non-GPS Navigation Using Signals of Opportunity", ECE Department, University of Cincinnati, Cincinnati, Ohio IEEE (2008).

Hall—"Radiolocation Using AM Broadcast Signals", PhD Thesis, Massachusetts Institute of Technology (Sep. 2002).

* cited by examiner

METHOD AND APPARATUS FOR DETERMINING LOCATION USING SIGNALS-OF-OPPORTUNITY

This invention was made with Government support under Contract FA8651-09-M-0175 awarded by the US Air Force. The government has certain rights in the invention.

BACKGROUND

The disclosures herein relate generally to location determining systems, and more specifically, to systems that determine location using radio signals.

Numerous systems have been developed throughout the years to determine location using radio signals. Some of these techniques include triangulation, radio ranging from a collection of direction finding measurements, passive and active tag ranging, time difference of arrival (TDOA) systems and global positioning systems (GPS), for example. These techniques rely on measurements in the "far field" of a radio transmitter. In other words, these measurements are performed at a substantial distance away from the radio transmitter in terms of radio signal wavelength.

The urban environment exerts a substantial impact on the propagation of radio frequency signals. This complex environment is known to effectively scramble or even block the propagation of radio frequency signals, especially those in the VHF, UHF and microwave part of the radio spectrum. Rapid variations in amplitude and phase may occur as these signals scatter and interfere with one another in complex ways. Difficulties with multi-path radio signal reception are commonplace in this hostile environment.

"RF fingerprinting" is one approach that a radio location system may use to overcome the complicated signal propagation of the urban environment. The motivation behind RF fingerprinting techniques is the hope that a sufficiently accurate map can be made to uniquely identify different transmit positions in the same way human fingerprints serve to uniquely identify different persons. For example, a network of sensors may be deployed throughout an area in which one desires to track personnel or assets. Signal strength measurements may localize a transmitter to a particular zone; however, positioning based on relative signal strength is inherently imprecise.

One variation of the RF fingerprinting approach attempts to use multi-path signals arriving at an antenna array to localize a transmitter. Multipath signals arriving at the antenna array are compared to a database of calibrated multipath signal signatures and corresponding locations. The location whose calibrated signal signature best matches the measured signature is selected as the most likely transmitter location. "RF fingerprinting" typically locates a mobile transmitter with respect to a network of receivers through which the mobile transmitter travels. This type of RF fingerprinting relies on the hope that the multi-path environment will be sufficiently stable and static to be repeatable. Unfortunately, multi-path environments are often unstable and dynamic, making location determination repeatability difficult in this type of system.

Improvements in radio location systems continue to be desirable including those systems that may operate in a complex propagation environment.

BRIEF SUMMARY

In one embodiment, a method of determining location is disclosed. In one embodiment, the disclosed method includes receiving, by a receiver, a radio frequency (RF) signal-of-opportunity that exhibits a signal component at the receiver, the RF signal-of-opportunity being perturbed by a perturber within the propagation environment of the receiver, the receiver being configured to receive the RF signal-of-opportunity within near field range of the perturber. The method also includes detecting, by the receiver, a signal characteristic of the signal component to provide signal characteristic information. The method further includes comparing the signal characteristic information with reference data to determine the current location of the receiver.

In another embodiment, a method of calibrating a location detector is disclosed. The method includes receiving, by a receiver, a first radio frequency (RF) signal-of-opportunity that exhibits a signal component at the receiver, the first RF signal-of-opportunity being perturbed by a perturber within the propagation environment of the receiver, the receiver being configured to receive the RF signal-of-opportunity at a current location within near field range of the perturber. The method also includes detecting, by the receiver, a signal characteristic of the signal component to provide signal characteristic information. The method further includes storing, by a reference data store, the signal characteristic information and corresponding location information designating the current location of the receiver, thus providing reference data to the reference data store.

In yet another embodiment, a method of determining location is disclosed. The method includes retrieving, by a receiver from a server, reference data that correlates a plurality of locations with a respective plurality of signal characteristics. The method also includes receiving, by the receiver, a radio frequency (RF) signal, the RF signal exhibiting a signal component at the receiver. The method further includes detecting, by the receiver, a signal characteristic of the signal component, thus providing signal characteristic information. The method still further includes comparing the signal characteristic information with the reference data to determine the current location of the receiver. In one embodiment, the retrieving step of the method may include retrieving, by the receiver from the server, coarse reference data that correlates a plurality of approximate locations with a respective plurality of signal characteristics. The comparing step may include comparing the signal characteristic information with the coarse reference data to determine the approximate current location of the receiver.

In still another embodiment, a method of determining location is disclosed. The method includes receiving, by a receiver, a radio frequency (RF) signal that exhibits a signal component at the receiver. The method also includes detecting, by the receiver, a signal characteristic of the signal component. The method further includes transmitting, by the receiver to a server, the signal characteristic. The method still further includes comparing, by the server, the signal characteristic to reference data, the reference data correlating a plurality of locations with a respective plurality of signal characteristics. The method also includes determining, by the server, the location of the receiver from the comparison step, thus providing a determined location of the receiver.

In yet another embodiment, a method of determining location is disclosed. The method includes determining a coarse location. The method also includes selecting, from a reference data store, particular reference data corresponding to the coarse location, the reference data store including reference data that correlates a plurality of locations with a respective plurality of signal characteristics. The method further includes receiving, by a receiver, a radio frequency (RF) signal, the RF signal exhibiting a signal component at the receiver. The method still further includes detecting, by the receiver, a signal characteristic of the signal component. The method also includes comparing the signal characteristic to the reference data, the reference data correlating a plurality of locations with a respective plurality of signal characteristics. The method further includes determining the current location of the receiver employing the comparison.

In a further another embodiment, a method of calibrating a location detector is disclosed. The method includes determining a coarse location. The method also includes querying a server to determine if reference data corresponding to a coarse location are available, the reference data correlating a plurality of locations with a respective plurality of signal characteristics. The method further includes querying a user, if reference data corresponding to a coarse location are not available, to determine if a user desires to calibrate the location detector, and if the user does desire to calibrate the location detector, continuing the process with the steps of 1) receiving, by a receiver, a first radio frequency (RF) signal, the first RF signal exhibiting a signal component at the receiver; 2) detecting, by the receiver, a signal characteristic of the signal component, and 3) storing, by a reference data store, the signal characteristic information along with respective location information designating the current location of the location detector to provide reference data to the reference data store.

In a still another embodiment, a location detector is disclosed. The location detector includes a receiver that receives a radio frequency (RF) signal-of-opportunity that exhibits a signal component at the receiver, the RF signal-of-opportunity being perturbed by a perturber within the propagation environment of the receiver, the receiver being adapted to receive the RF signal-of-opportunity within near field range of the perturber. The location detector also includes a signal characteristic detector that detects a signal characteristic of the signal component to provide signal characteristic information. The location detector further includes a comparing apparatus, responsive to the signal characteristic information, that compares the signal characteristic information with reference data to determine the current location of the receiver.

In a still another embodiment, a location detector adapted for calibration is disclosed. The location detector includes a receiver that receives a first radio frequency (RF) signal-of-opportunity that exhibits a signal component at the receiver, the first RF signal-of-opportunity being perturbed by a perturber within the propagation environment of the receiver, the receiver being adapted to receive the RF signal-of-opportunity at a current location within near field range of the perturber. The location detector also includes a signal characteristic detector that detects a signal characteristic of the signal component to provide signal characteristic information. The location detector further includes a reference data store that stores the signal characteristic information and corresponding location information designating the current location of the receiver, thus providing calibration reference data to the reference data store.

In yet another embodiment, a computer program product is disclosed for use to determine location. The computer program product includes a computer readable storage medium. The computer program product includes first program instructions that receive a radio frequency (RF) signal-of-opportunity that exhibits a signal component at a receiver, the RF signal-of-opportunity being perturbed by a perturber within the propagation environment of the receiver, the receiver being adapted to receive the RF signal-of-opportunity within near field range of the perturber. The computer program product also includes second program instructions that detect a signal characteristic of the signal component to provide signal characteristic information. The computer program product further includes third program instructions that compare the signal characteristic information with reference data to determine the current location of the receiver. The first, second, and third program instructions are stored on the computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1A:
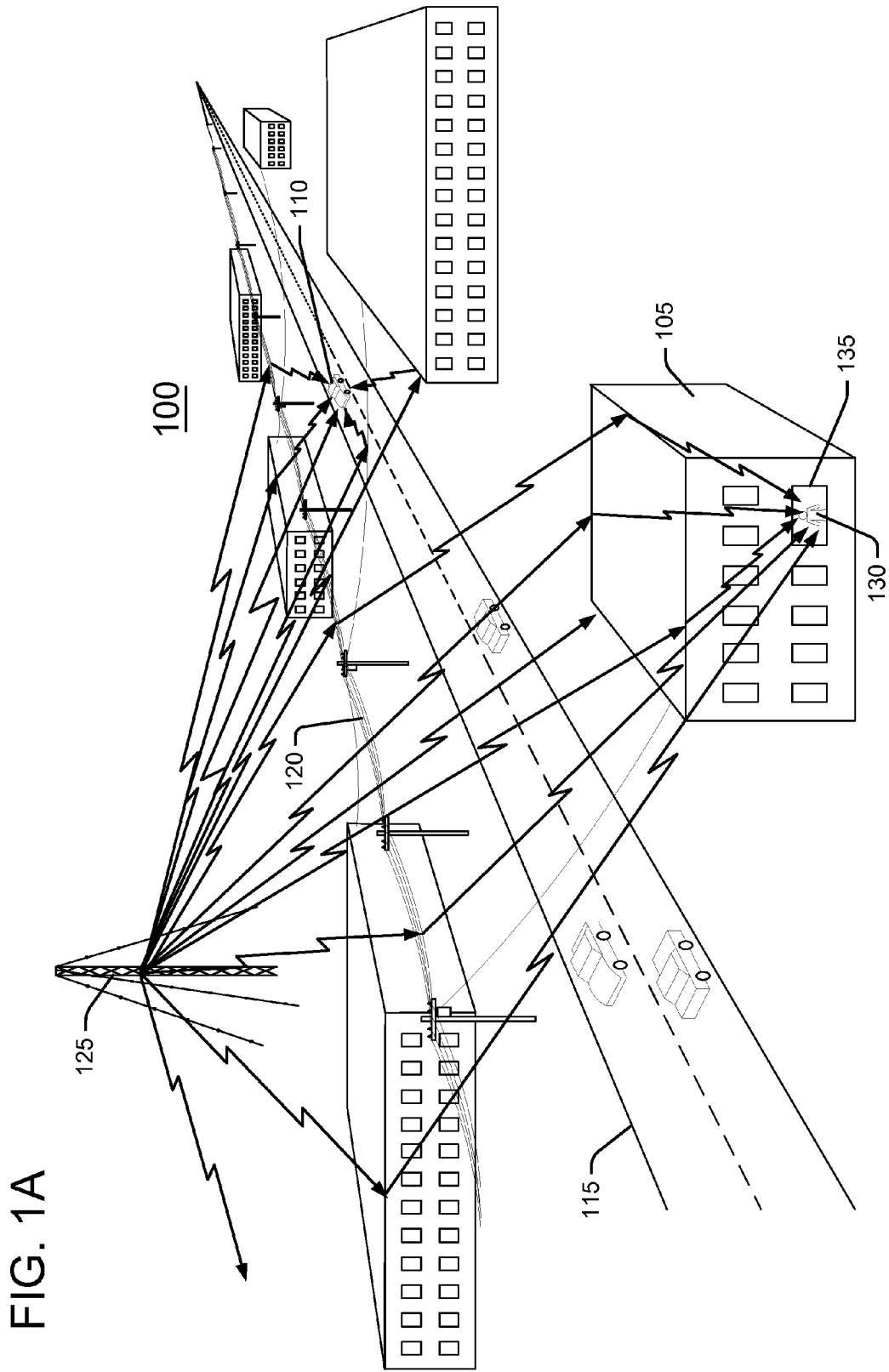
FIG. 1A is a representation of a complex urban RF propagation environment.

A preferred embodiment of the disclosed location determining system employs "signals-of-opportunity" in the standard broadcast AM band to determine the location of a particular radio receiver. Some conventional RF fingerprinting approaches may locate a mobile transmitter with respect to a network of local receivers using frequencies not associated with the standard broadcast AM band. However, in the preferred embodiment of the disclosed location determining system, a signal-of-opportunity location detector (SOLD), namely an individual receiver, locates itself with respect to a number of distant AM broadcast stations. Other embodiments may employ other frequencies less than or greater than those of the standard broadcast AM band (520 KHz-1710 KHz) depending on the particular application.

Near field electromagnetic ranging (NFER) is a technique useful for determining location. One NFER approach uses a local beacon transmitter and a locator receiver. The beacon transmitter transmits a radio signal that is received by the locator receiver, the locator receiver being located within the near field range of the local beacon transmitter and radio signal. The locator receiver may distinguish two or more characteristics of the received signal and use these characteristics to determine location. More detailed information with respect to near field electromagnetic ranging and location determination is found in commonly assigned U.S. Pat. No. 6,963,301, issued Nov. 8, 2005, entitled "System And Method For Near-Field Electromagnetic Ranging", the disclosure of which is incorporated herein by reference in its entirety. NFER is also useful for determining angle-of-arrival of a radio signal, such as described in commonly assigned patent application publication US2009/0280742A1, published Nov. 12, 2009, entitled "Multiple Phase State Near-Field Electromagnetic System And Method For Communication And Location", the disclosure of which is incorporated herein by reference in its entirety.

Complicated propagation environments, for example urban, underground and indoor settings, tend to perturb the near-field phase relations that a near field location system may rely upon. Calibration methods useful in this situation are taught by commonly assigned U.S. Pat. No. 7,298,314, issued Nov. 20, 2007, entitled "Near-Field Electromagnetic Positioning System and Method", the disclosure of which is incorporated herein by reference in its entirely, and further by commonly assigned U.S. Pat. No. 7,592,949, issued Sep. 22, 2009, entitled "Near-Field Electromagnetic Positioning Calibration System and Method", the disclosure of which is incorporated herein by reference in its entirely, and commonly assigned U.S. patent application Ser. No. 12/563,960, filed Sep. 21, 2009 entitled "Near-field electromagnetic positioning calibration system and method", the disclosure of which is incorporated herein by reference in its entirely.

Methods for displaying location information in a near field radio location system are taught by commonly assigned U.S. Pat. No. 7,538,715, issued May 26, 2009, entitled "Electromagnetic Location and Display System and Method", the disclosure of which is incorporated herein by reference in its entirely. Methods for using orthogonal magnetic antennas in a near field radio location system are disclosed in commonly assigned U.S. Pat. No. 7,307,595, issued Dec. 11, 2007, entitled "Near Field Location System and Method", the disclosure of which is incorporated herein by reference in its entirely. Compact antenna designs for near field radio location systems are taught by commonly assigned U.S. patent application Ser. No. 11/473,595, filed Jun. 22, 2006, entitled "Space Efficient Magnetic Antenna System", the disclosure of which is incorporated herein by reference in its entirely. Phase properties of near field signals from orthogonal magnetic and other multiple antenna near field transmission signals enable additional phase comparison states useful for location and communication, as disclosed in commonly assigned U.S. patent application Ser. No. 12/391,209", entitled "Multi-State Near-Field Electromagnetic System And Method For Communication And Location", the disclosure of which is incorporated herein by reference in its entirely. A real time location system (RTLS) using near field electromagnetic ranging in complex propagation environments such as a warehouse is disclosed in commonly assigned U.S. patent application Ser. No. 11/897,100, filed Aug. 29, 2007, entitled "System And Method For Simulated Dosimetry Using A Real Time Location System", the disclosure of which is incorporated herein by reference in its entirely. More information with respect to real time radio location systems using near field location detection methodology is found in commonly assigned U.S. patent application Ser. No. 11/890,350, entitled "Asset Localization, Identification, And Movement System And Method", filed Aug. 6, 2007, the disclosure of which is incorporated herein by reference in its entirely.

FIG. 1A is a representation of a complex urban RF propagation environment 100 that includes multiple buildings, such as building 105, and a vehicle 110 travelling along a roadway 115 between the buildings. Electrical power lines 120 are situated along roadway 115. A distant radio tower 125 transmits standard broadcast AM radio signals from a transmitter (not shown) to propagation environment 100. Radio tower 125 may be several kilometers away from vehicle 110 and building 105. A person 130 in a window 135 of building 105 and vehicle 100 are potential reception locations for the signals that distant tower 125 transmits. Buildings such as building 105, electrical power lines 120 and other obstacles cause localized distortions and deviations in medium and low frequency radio signals from tower 125. When such medium and low frequency radio signals propagate through urban environment 100, they couple to scatterers such as building 105 and power lines 120 thus causing the scatterers to resonate. This local resonance behavior introduces near field components to what would otherwise be far field components from distant radio tower 125. These local scatterers effectively act as re-transmitters that introduce near field components that are detectable by the disclosed signal-of-opportunity location detector (SOLD) as discussed in more detail below. The coupling and scattering obstructions in the propagation environment act as secondary sources for reactive, near field energy. The localized distortions and deviations of medium and low frequency radio signals from theoretically ideal behavior do themselves provide the basis for a highly accurate geo-location system.

In more detail, urban environments distort the propagation of medium and low frequency radio signals because such environments include entities with conductors exhibiting an appropriate size to interact with these radio signals. These distortion-introducing entities may be referred to as scatterers by an analogy to the quasi-optical behavior of higher frequency shorter wavelength radio waves. However, the coupling of interest is principally a near field interaction taking place on a scale comparable to a distance about $\lambda/2\pi$ away from a scatterer. With a sufficiently sensitive detector, near field behavior may be detectable to as far as approximately one wavelength away from the local scatterer in the propagation environment.

The signals employed by the disclosed location detection system are defined as "signals-of-opportunity" signals in that they are not placed in the local environment 100 by distant radio transmitting tower 125 for the purpose of radio location. Rather, distant radio transmitting tower 125 transmits radio signals to environment 100 for the purpose of radio communication of programming content such as talk, music and other entertainment forms. The inventors have discovered that these radio signals, after being perturbed by the local environment, are opportunistically present and useable for radio location detection purposes. These radio signals are thus "signals-of-opportunity" that will be used by the disclosed location detection methodology for a purpose other than their intended purpose of communication.

The preferred embodiment of the disclosed SOLD radio location system employs a SOLD in the AM standard broadcast band. The ubiquity and relatively high power of such signals are conducive to a SOLD receiver. However, the teachings herein are also applicable for radio waves of any frequency in which the wavelengths are long compared to the typical distance between scatterers in the propagation environment and the locations at which one desires to make a location determination. In an urban environment, it is expected that radio signals up to and including the HF band (approx. 3-30 MHz) may be of some utility for a signal-of-opportunity radio location detector. The teachings herein may also apply to using unintentional or incidental signals-of-opportunity. In some propagation environments that are particularly dense with scatterers, the teachings herein may also apply to FM and other broadcast signals with a frequency up to approximately 100 MHz and/or wavelengths of down to approximately 3 meters, depending on the particular application.

As stated above, FIG. 1A shows a conceptual representation of an urban RF propagation environment 100 that includes buildings 105 and electrical lines 120 that tend to distort standard broadcast band AM radio signals. This distortion remains relatively localized and for this reason enables accurate geo-location. Because the near field perturbations in an otherwise far field radio signal result from interactions with fixed objects in the environment 100 like buildings 105 and electric power lines 120, the disclosed location detection system that maps and characterizes these perturbations exhibits good accuracy and repeatability. For example, accurate location detection and tracking is possible within the near-field range of the perturbing sources, for example within approximately $\lambda/2\pi$ to as far away as approximately $\lambda$ in some embodiments. These perturbing sources effectively act as retransmitters of the AM radio signal, albeit in distorted, perturbed forms. Moreover, spatial variability in AM broadcast band noise levels from location to location, enables tracking on the noise background, including incidental or unintentional radio emissions from local or other noise sources. It was found that in many cases, the noise levels observed in environment 100 are sufficiently stable over suitable long time periods to act as a source of additional geo-location information.

Figure 1B:
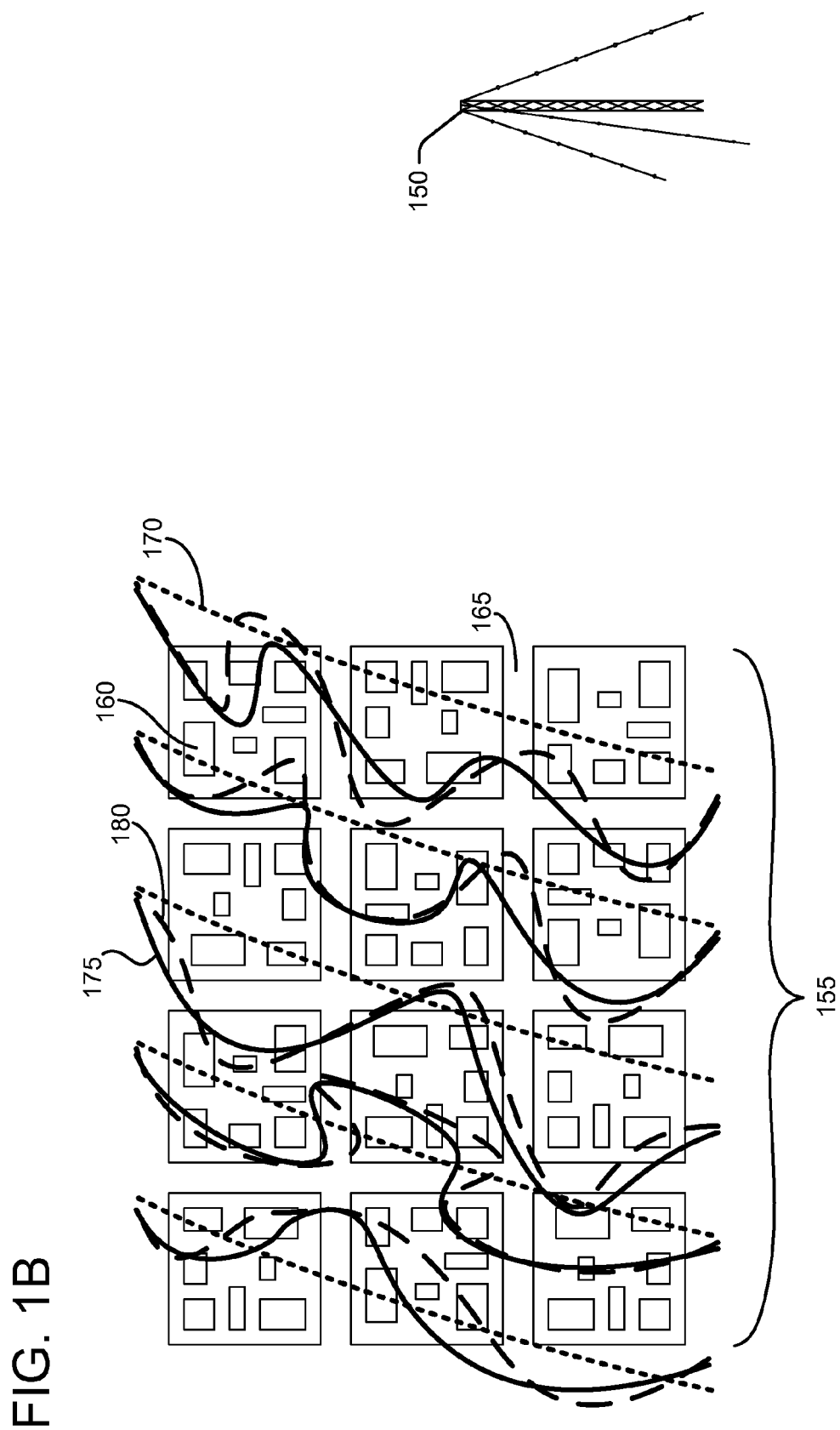
FIG. 1B is a representation of radio signal contours in an open field environment and in a complex environment.

FIG. 1B is a representation of radio propagation in an open field environment and radio propagation in a complex environment such as an urban environment with multiple buildings. A distant transmitter tower 150 transmits radio signals to an urban environment 155 that includes multiple buildings such as building 160, multiple streets such as street 165 and electric power lines (not shown). Short dashed lines 170 represent signal contours that the field generated by transmitter tower 150 would exhibit in environment 155 if environment 155 were an open field with no buildings, electric lines and other obstructions. Solid lines 175 and long dashed lines 180 respectively represent the distorted magnetic and electric field signal contours that the radio signal generated by transmitter tower 150 exhibits in environment 155 due to local perturbations of the radio signal caused by interaction with buildings, electric lines and other obstructions. Environment 155 is situated within what is considered to be the far field of the signals transmitted by transmitter tower 150. The buildings and other structures within environment 155 provide perturbing sources that distort and effectively locally retransmit the radio signals from distant tower 150.

In more detail, FIG. 1B illustrates signal propagation in a hypothetical multi-block urban environment 155. In an ideal open field environment, signals from a distant transmitter 150 might yield uniform iso-phase contours, i.e. short dashed lines 170. As signals from distant transmitter 150 propagate through the hypothetical multi-block urban environment 155 of FIG. 1B, electric and magnetic signals components couple differently to the scatterers or perturbers within the urban environment. This results in electric iso-phase contours (solid lines 175) and magnetic iso-phase contours (long dashed lines 180) that are different from each other and from the uniform iso-phase contours 170 expected in an ideal open field environment. These phase perturbations, depicted in FIG. 1B also imply amplitude perturbations of signals from distant transmitter 150. The disclosed location detection methodology teaches exploiting these phase and amplitude perturbations (caused by signal propagation through urban, industrial, indoor, and other environments) to provide location information. Accurate location detection and tracking is possible within the near-field range of the perturbing sources.

Figure 2:
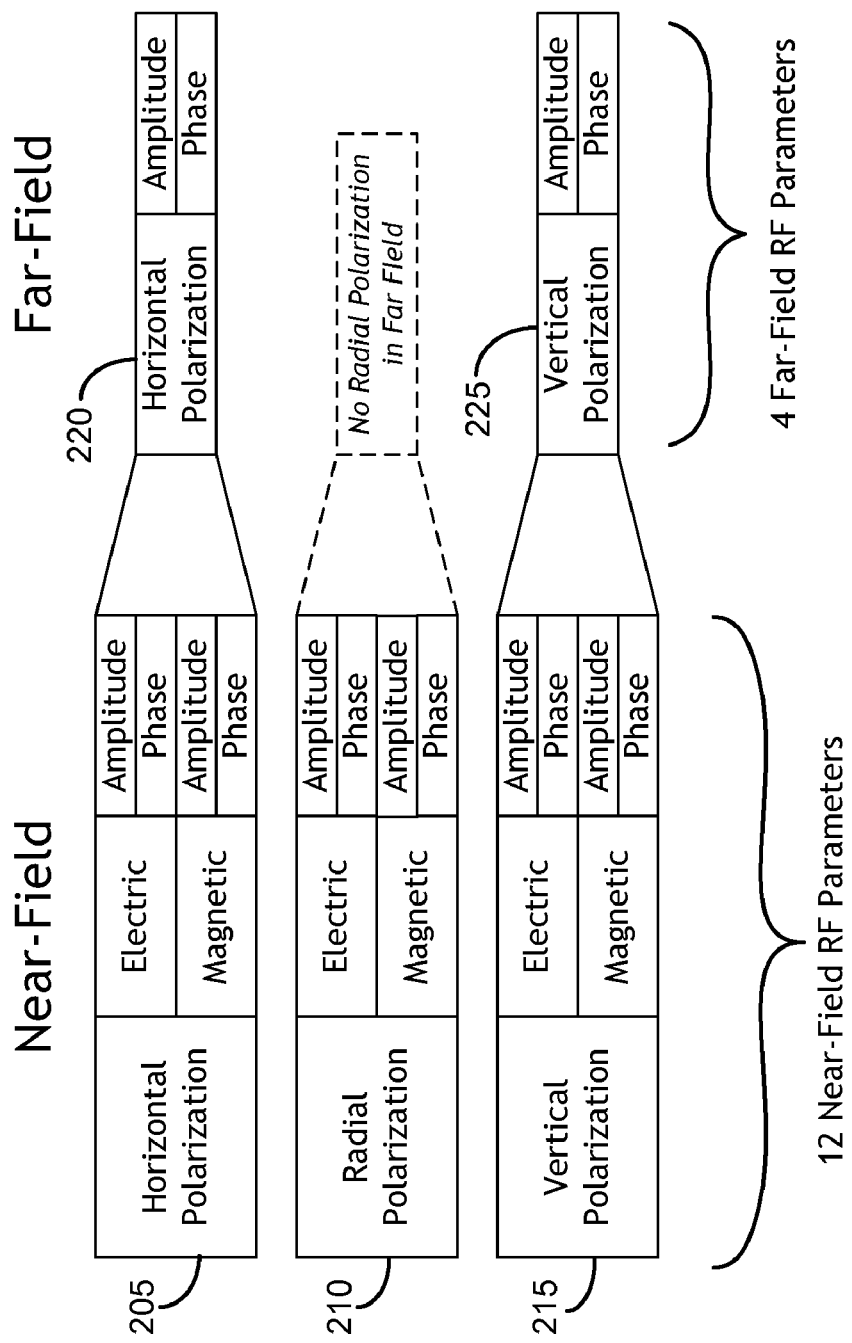
FIG. 2 is a representation of 12 independent physical parameters that near field signals exhibit and the up to 4 parameters that a far field signal may exhibit.

FIG. 2 is a representation of the 12 independent physical parameters that near field signals exhibit that may be usable for geo-location purposes and the up to 4 parameters that a far field signal may exhibit. The near field exhibits a very complex structure including components such as a horizontal polarization 205, a vertical polarization 210 and a radial polarization 215. Each of these polarization components exhibits an electric field and a magnetic field within the near field of the local perturbing source. Each of these 6 electric and magnetic fields exhibits distinctive amplitude and phase signal characteristics. Thus, the near field includes up to 12 distinctive signal characteristics that the disclosed radio location system may employ. In contrast, the far field includes a horizontal polarization 220 and a vertical polarization 225, each of which exhibits respective amplitude and phase characteristics. In the far field, the electrical and magnetic field components have synchronized or merged. Thus, the far field may include only up to 4 signal characteristics that may be usable for location detection. Consequently, the near field includes more trackable parameters or signal characteristics than the far field. Transverse polarizations are characterized as "vertical" and "horizontal." Equivalently, one could define these polarizations as circular (clockwise and counter-clockwise) or any other orthogonal separation of polarization components.

From FIG. 2, it is seen that the near field is a much more complex structure than the far field of the radio signals transmitted by tower 150 of FIG. 1B. The near field includes a third polarization, namely radial polarization 210 in which the electric and magnetic field components have not yet merged to form a 376.7 ohm impedance free space electromagnetic wave. We have discovered that standard broadcast band AM signals exhibit near field behavior when they encounter scatterers such as obstructions even many wavelengths away from transmitting tower 150. Despite being many wavelengths away from tower 150 at distances that would normally be within the far field zone, most locations in environment 100 are within near field range of local scatterers, i.e. local perturbers such as buildings, electric power lines and other obstructions.

By comparing particular near field properties or near field signal characteristics, including field impedance (the ratio of electric field to magnetic field intensity), phase and amplitudes of different field components, and by measuring the common-mode differences between these components, one embodiment of the disclosed radio location system obtains stable, robust RF data that is usable for location determination. One embodiment of the disclosed radio location determining system requires neither precise timing nor precise synchronization between and among a cooperative network of receivers. The disclosed radio location determining system is a signal-of-opportunity location detector (SOLD) that employs these near field signal characteristics of distant signals-of-opportunity that impinge on local scatterers or perturbers in local environment 100. The signal characteristics recorded in the reference data set 312, discussed below with respect to FIG. 3, may include amplitude information, amplitude differences information or phase differences information, for example.

Figure 3:
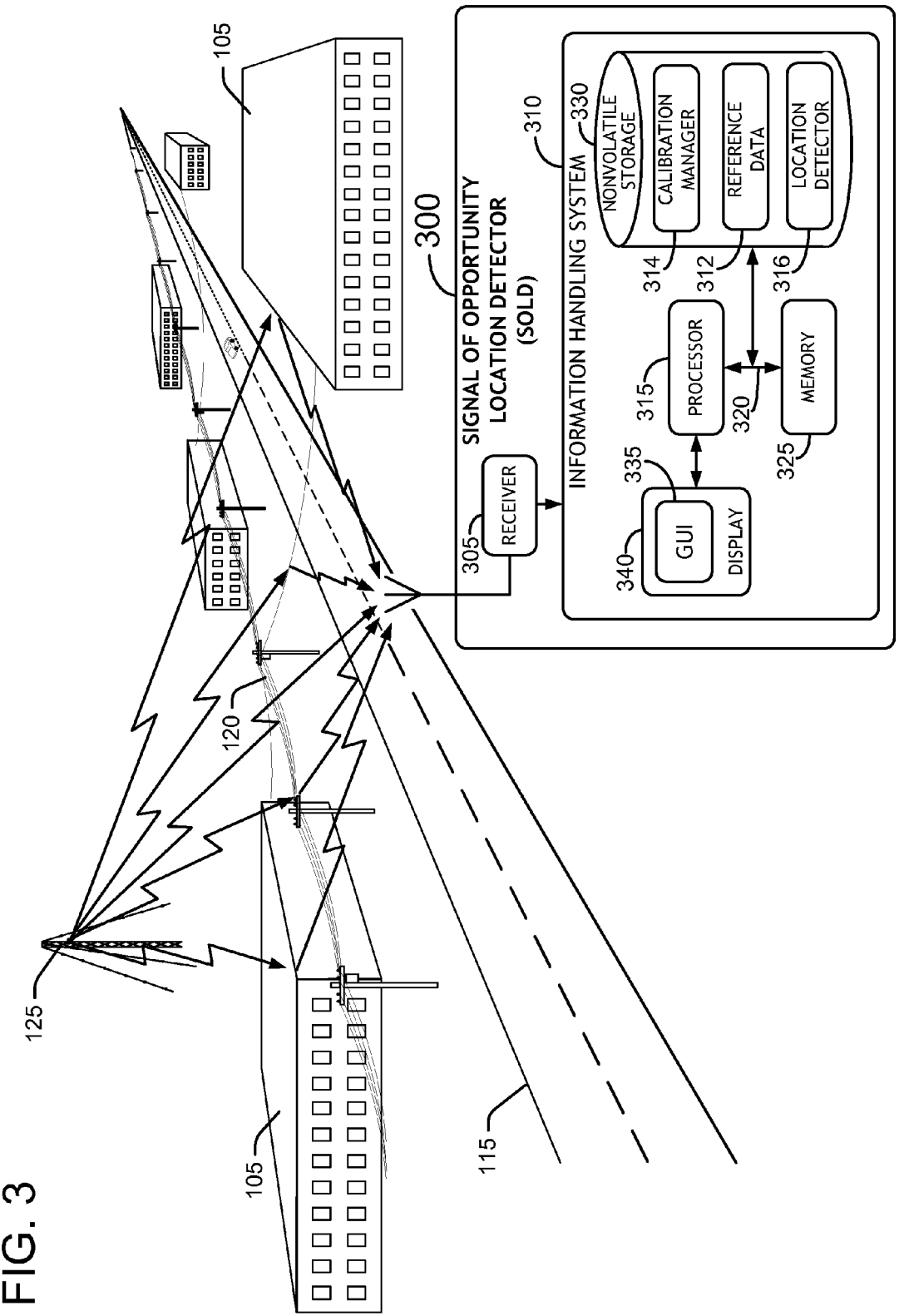
FIG. 3 is a simplified block diagram of one embodiment of the disclosed signal-of-opportunity-detector (SOLD).

FIG. 3 is a simplified block diagram of a SOLD 300. SOLD 300 includes a receiver 305 that detects signals of interest transmitted by tower 125 and other distant transmitter towers (not shown). At a high level, SOLD 300 detects and compares signal characteristics of the received signal with a reference data set 312 to determine the location of SOLD 300. This is the "location detection mode" of SOLD 300. In one embodiment, the reference data set 312 is determined by moving SOLD 300 to various selected locations in the propagation environment to build up calibration or reference data set 312. This is the "calibration mode" of SOLD 300. Reference data set 312 includes signal characteristics information for each selected location, as described in more detail below. In one embodiment, this collection of calibration data may be performed with reference to an absolute coordinate system or map.

Figure 8:
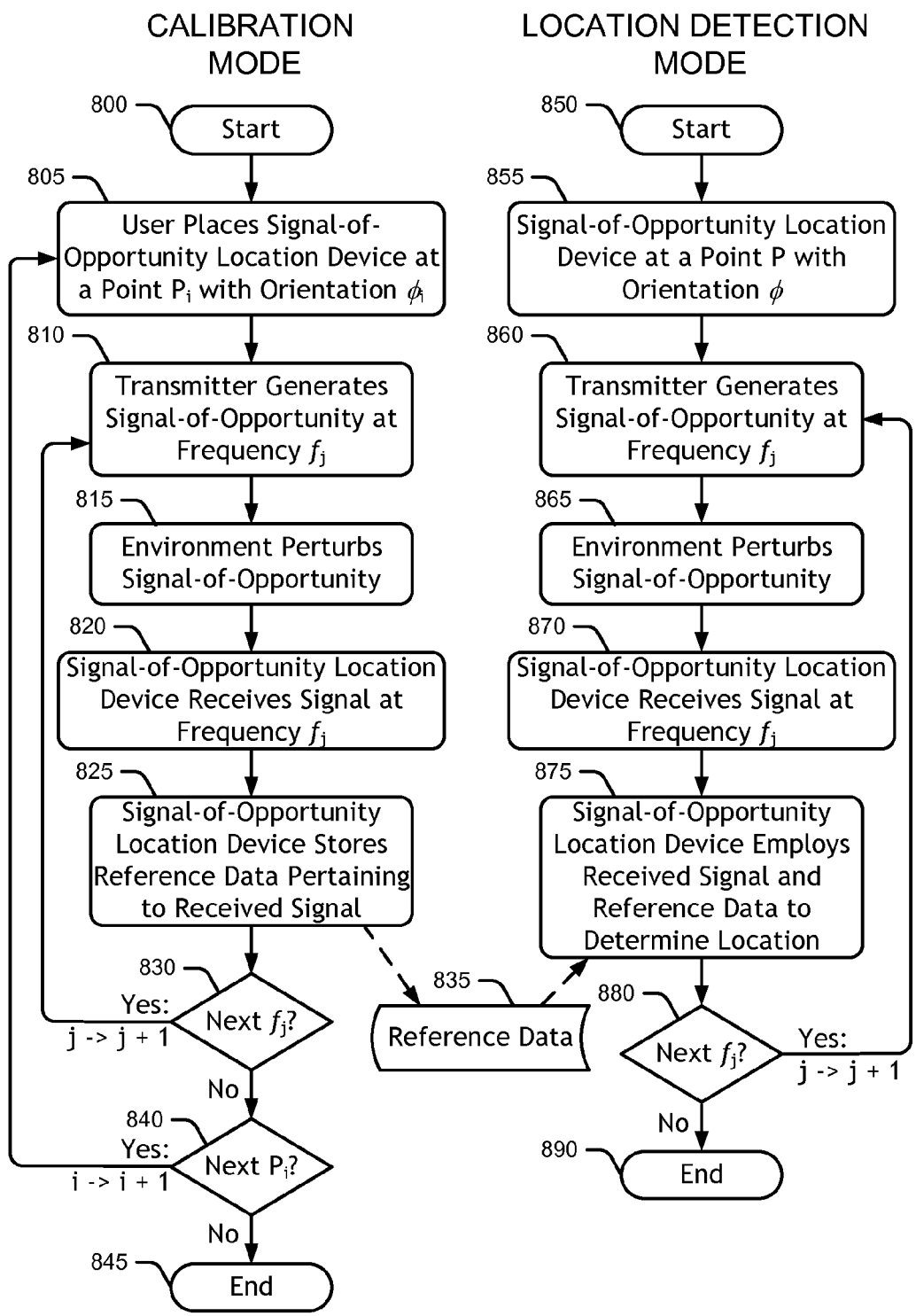
FIG. 8 is a flowchart that illustrates a representative "calibration mode" on the left side and a representative "location detection mode" on the right side.
Figure 9:
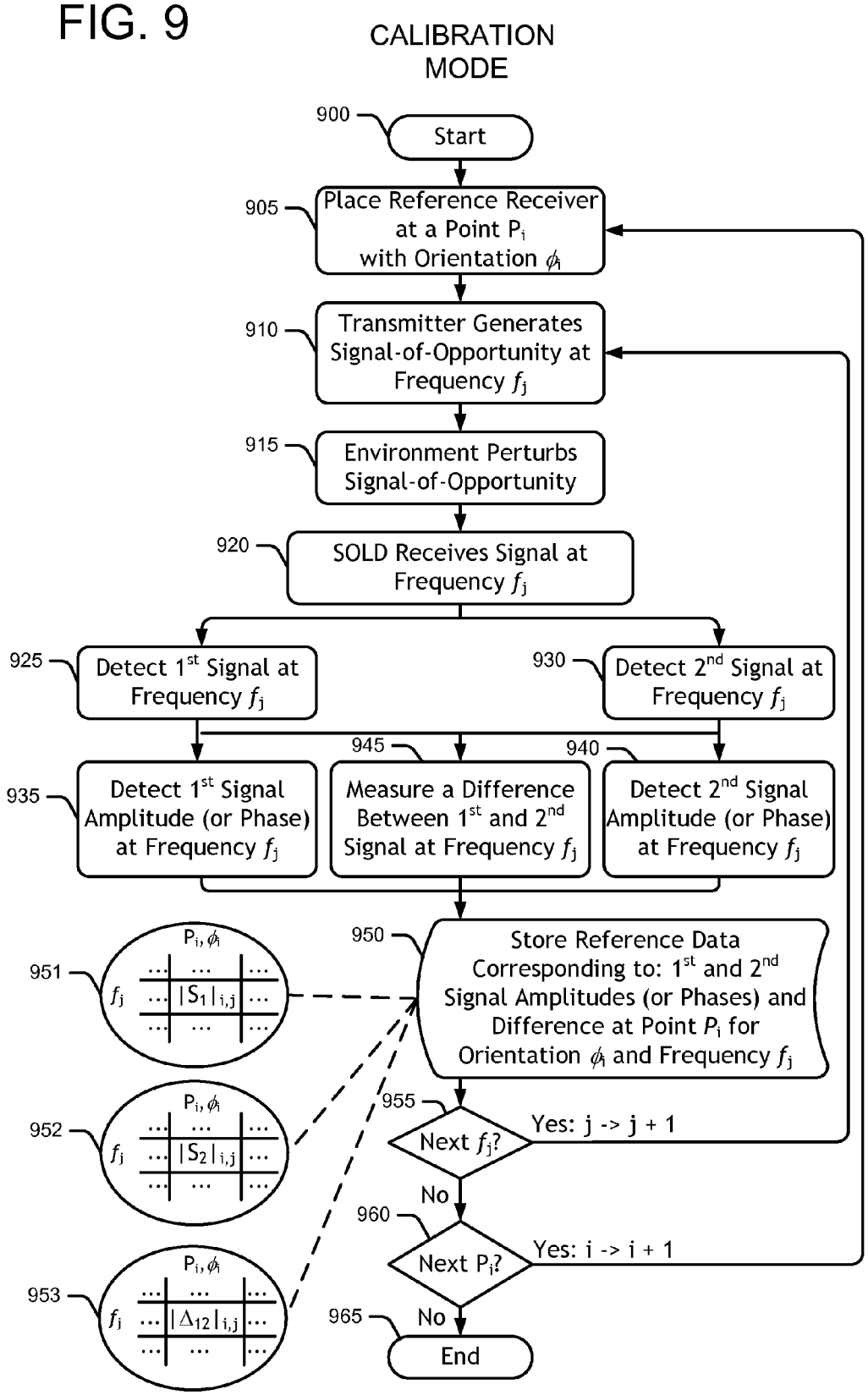
FIG. 9 is a flowchart that shows a preferred calibration methodology for the disclosed SOLD.
Figure 10:
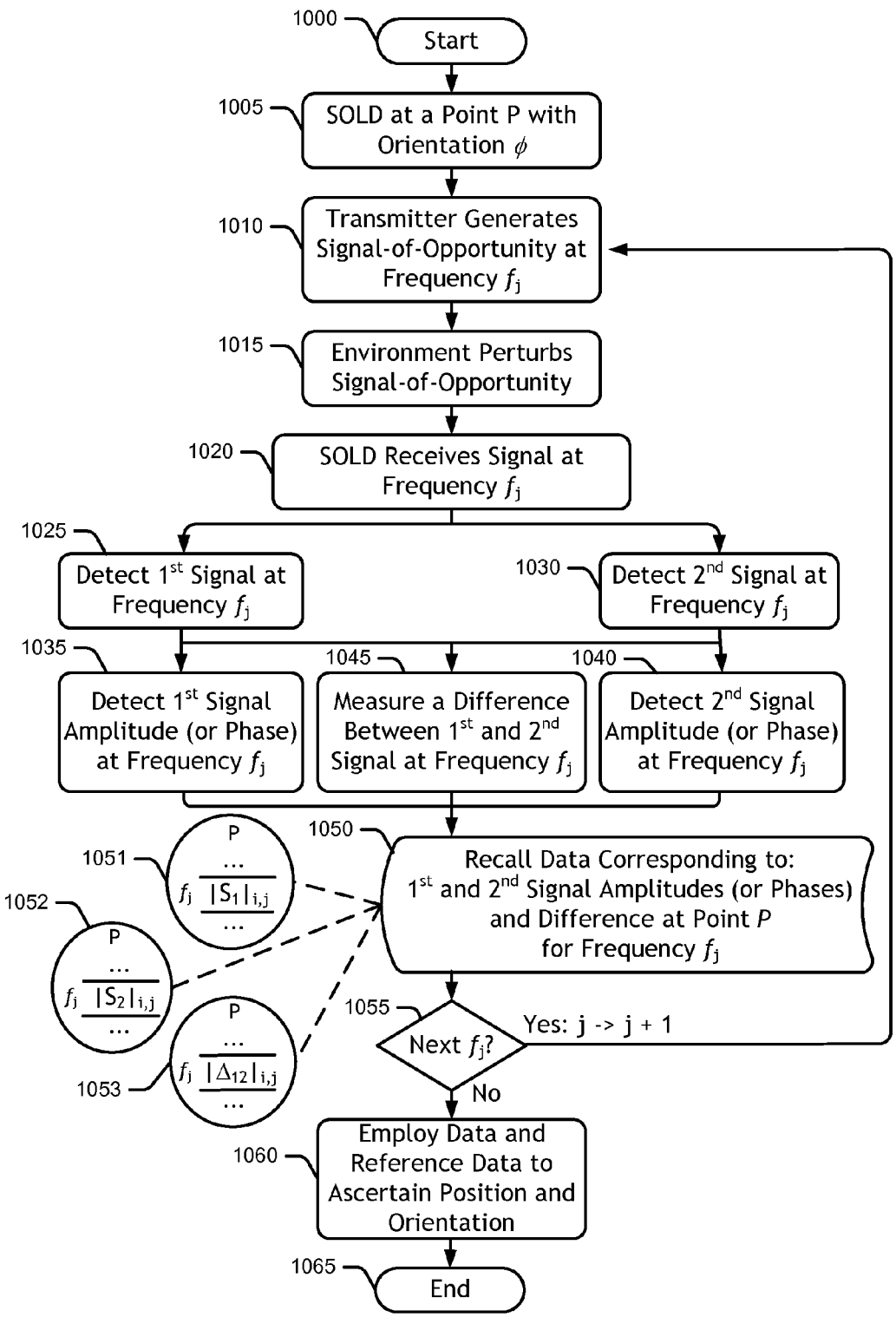
FIG. 10 is a flowchart that shows a preferred location detection methodology for the disclosed SOLD.

As seen in FIG. 3, SOLD 300 may include an information handling system (IHS) 310 with a processor 315 that couples via a bus 320 to a memory 325 and nonvolatile storage 330. Nonvolatile storage 330 stores reference data set 312. During calibration mode, processor 315 employs a calibration manager 314 to process the signal characteristics information that it receives from receiver 305 to build reference data set 312. Calibration manager 314 stores signal characteristics information, such as amplitude, amplitude differences and phase differences for each calibration location in reference data set 312. IHS 310 includes a location detector 316 that is used after reference data set 312 is built up to locate SOLD 300 in the propagation environment. Location detector 316 compares current signal characteristics information at a particular location in the propagation environment with the signal characteristics information in reference data set 312 to find the best match. The best match provides information with respect to the current location of SOLD 300. In one embodiment, processor 315 generates a graphical user interface (GUI) 335 for display on display 340. GUI 335 may show the current location of SOLD 300 on a map for easy visualization by the user. Calibration manager 314 and location detector 316 may be implemented in software, hardware or firmware, depending upon the particular application. More detail with respect to the operation of calibration manager 314 is shown in the flowcharts of FIGS. 8 and 9. More detail with respect to the operation of location detector 316 is shown in the flowcharts of FIGS. 8 and 10.

IHS 310 may also include I/O devices (not shown) such as a keyboard and mouse for inputting information and instructions to SOLD 300 and a network adapter such as a wireless network adapter to connect SOLD 300 to other systems. In one embodiment, reference data 312 may be stored remotely from SOLD 300, for example, on a remote server or other IHS that connects to the SOLD via the Internet. In that embodiment, calibration manager 314 stores reference data, i.e. signal characteristics information, on the remote server and location detector 316 retrieves the stored signal characteristics information from the remote server via a network such as a wireless network.

The particular IHS 310 that SOLD 300 employs may take many forms. For example, IHS 310 may take the form of a portable, laptop, notebook, netbook, tablet or other form factor computer or data processing system. IHS 310 may take still other form factors such as a personal digital assistant (PDA), a portable telephone device, a communication device or other devices that include a processor, memory and display.

In one embodiment, while in calibration mode, SOLD 300 is moved from location to location in a propagation environment and received signal characteristics such as amplitude, amplitude differences and phase differences are determined at each location. The received signal characteristics are stored as calibration or reference data set 312 for later location determination activity. Each location at which SOLD 300 performs a determination of received signal characteristics during calibration mode may be referred to as a calibration location or calibration point. A sufficiently dense calibration, i.e. calibration locations being sufficiently close together in the local propagation environment, enables accurate interpolation to determine location between calibration locations. For instance, one may subdivide the tracking area or environment into triangles at whose vertices lie calibration points using the process of DeLauney triangulation. Each triangle defines a plane within which received parameters such as amplitude, amplitude differences, or phase difference may be readily interpolated from the values at the vertices of the triangle.

In an alternative embodiment, while in calibration mode, SOLD 300 may be moved along a particular path through the propagation environment to characterize the path for future travel by SOLD 300 using a linear interpolation of signal characteristics information between calibration locations. This approach is useful for calibrating an inertial location determining system. Although the SOLD may not be able to determine an absolute location in this embodiment, the SOLD can determine if it has returned to an earlier location and orientation, allowing for removal or compensation of whatever drift may have accumulated in an accelerometer or gyro since the time that the SOLD was last at that relative location.

In another alternative embodiment, IHS 310 need not be separate from receiver 305. In that embodiment, IHS 310 may be integrated within receiver 305 such that receiver 305 includes one or more of processor 315, memory 325, nonvolatile storage 330 and display 340.

Figure 4:
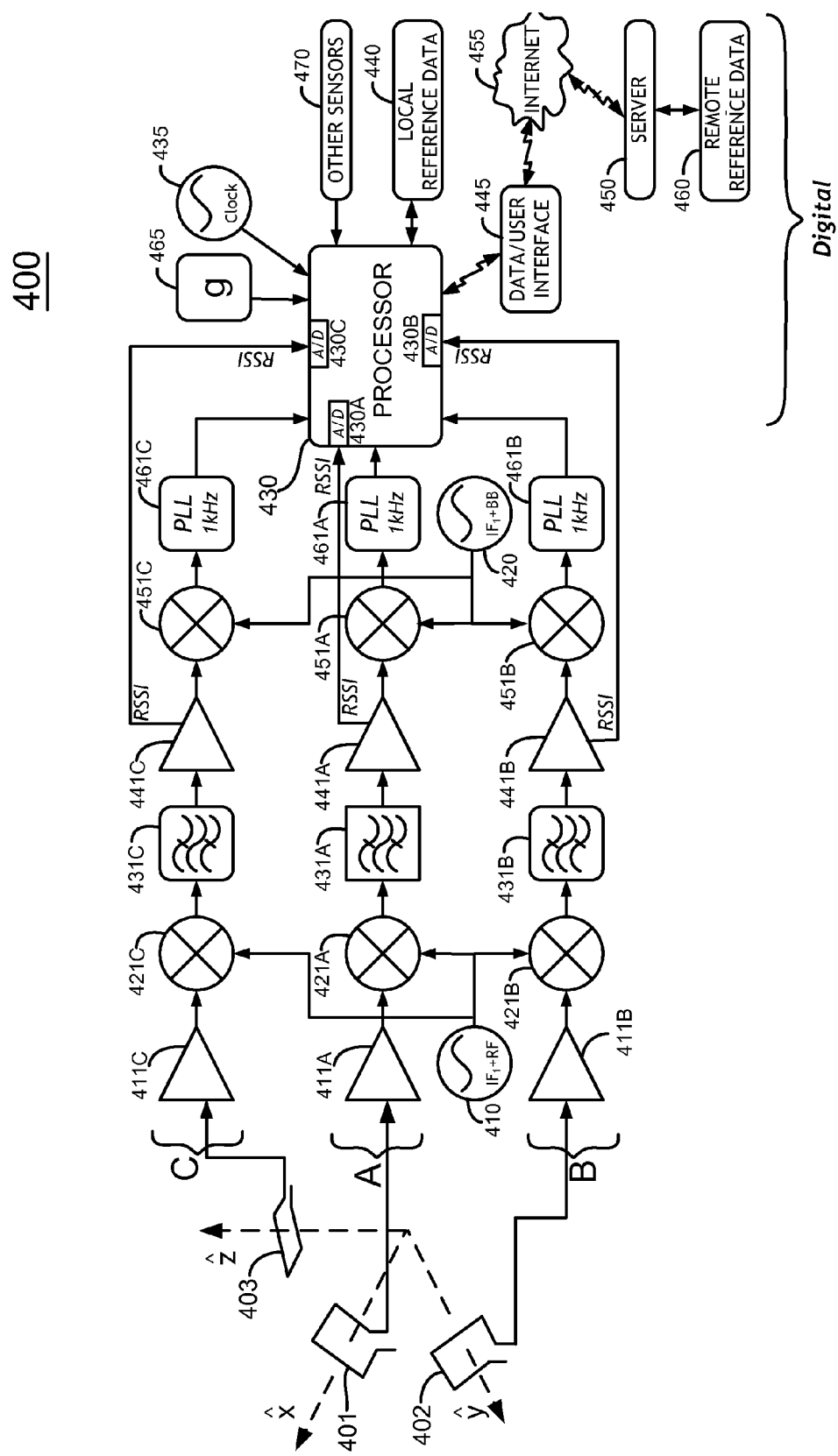
FIG. 4 is a block diagram of a preferred embodiment of a super-heterodyne SOLD receiver.

FIG. 4 is a block diagram of a preferred embodiment of a super-heterodyne SOLD receiver 400. SOLD receiver 400 receives and measures all three magnetic field components of the radio signal at the point of reception, i.e. the magnetic field components of the horizontal, vertical and radial polarizations of the radio signal. Magnetic antennas 401, 402, and 403 are mutually orthogonal and cooperate so as to detect orthogonal vertical, horizontal, and radial magnetic field components depending on an orientation of axes x, y, z with respect to the orthogonal magnetic field components. One example of a magnetic antenna useful as magnetic antennas 401, 402 and 403 is a loop antenna. Magnetic antennas 401, 402 and 403 are orthogonally situated with respect to one another.

SOLD 400 includes 3 magnetic field channels A, B and C oriented along 3 orthogonal axes x, y and z, respectively. Channel A is representative of the 3 channels and is now discussed. In channel A, magnetic loop antenna 401 couples to an RF preamplifier 411A. Mixer 421A mixes the signal from first local oscillator 410 (at $IF_1+RF$) with the preamplified RF signal up to a first intermediate frequency ($IF_1$). Bandpass filter 431A provides filtering and amplifier 441A provides additional amplification. Mixer 451A mixes the signal from amplifier 441A (at $IF_1$) with the signal from second local oscillator 420 (at $IF_1+BB$), down to baseband BB. Phase lock loop PLL 461A cooperates with mixer 451A to provide the baseband signal BB to processor 430. PLL 461A improves signal capture and stability in magnetic field channel A of SOLD 400. Amplifier 441A provides a received signal strength indicator (RSSI) signal to analog to digital (A/D) converting input 430A of processor 430. A clock 435 couples to processor 430 to provide a time base thereto.

Magnetic field channel B includes several components analogous to components of magnetic field channel A. These components are similarly numbered except with a B designation following the component number. More particularly, magnetic field channel B includes a preamplifier 411B, mixer 421B, bandpass filter 431B, amplifier 441B, mixer 451B, and PLL 461B. PLL 461B provides the down-converted baseband signal BB to processor 430. Amplifier 441B provides a received signal strength indicator (RSSI) signal to analog to digital (A/D) converting input 430B of processor 430.

Magnetic field channel C includes several components analogous to components of channel A and B. These components are similarly numbered except with a C designation following the component number. More particularly, magnetic field channel C includes a preamplifier 411C, mixer 421C, bandpass filter 431C, amplifier 441C, mixer 451C, and PLL 461C. PLL 461C provides the down-converted baseband signal BB to processor 430. Amplifier 441C provides a received signal strength indicator (RSSI) signal to analog to digital (A/D) converting input 430C of processor 430. In this manner, processor 430 receives signal information from magnetic field channels A, B and C.

When SOLD 400 operates in calibration mode collecting signal information at different calibration locations, processor 430 stores reference data in local reference data store 440. Local reference data store 440 includes signal characteristics information for the various calibration locations. SOLD 400 includes a data/user interface 445 that may include a graphical user interface (GUI) display. In one embodiment, the data interface portion of interface 445 couples to a remote server 450 via the Internet 455 or other network. SOLD 400 may store reference data as remote reference data 460 at server 450. In this manner, the user of SOLD 400 or another SOLD may access the remote reference data 460 to determine the location of that user's SOLD.

SOLD 400 may include an accelerometer 465 that couples to processor 430 to inform SOLD 400 which direction is up to assist in determining the orientation of SOLD 400. Other sensors 470 such as a gyroscope and/or compass may be coupled to processor 430 to assist SOLD 400 in determining orientation and direction of travel. It is noted that SOLD 400 with its three magnetic antennas 401, 402 and 403, may be useful while worn on the human body for location detection activities because the human body does not effectively short the magnetic signals that these antennas receive. The stages of SOLD 400 between magnetic antennas 401, 402 and 403 and processor 430 cooperate to supply processor 430 with signal characteristics information. This signal characteristics information may include received signal strength (RSSI) or amplitude of the three respective components provided by the three magnetic antennas 401, 402 and 403. The signal characteristics information may include phase information. For example, phase detectors in PLLs 461A, 461B and 461C may provide processor 430 with phase information for the three respective components provided by the three magnetic antennas 401, 402 and 403.

Figure 5:
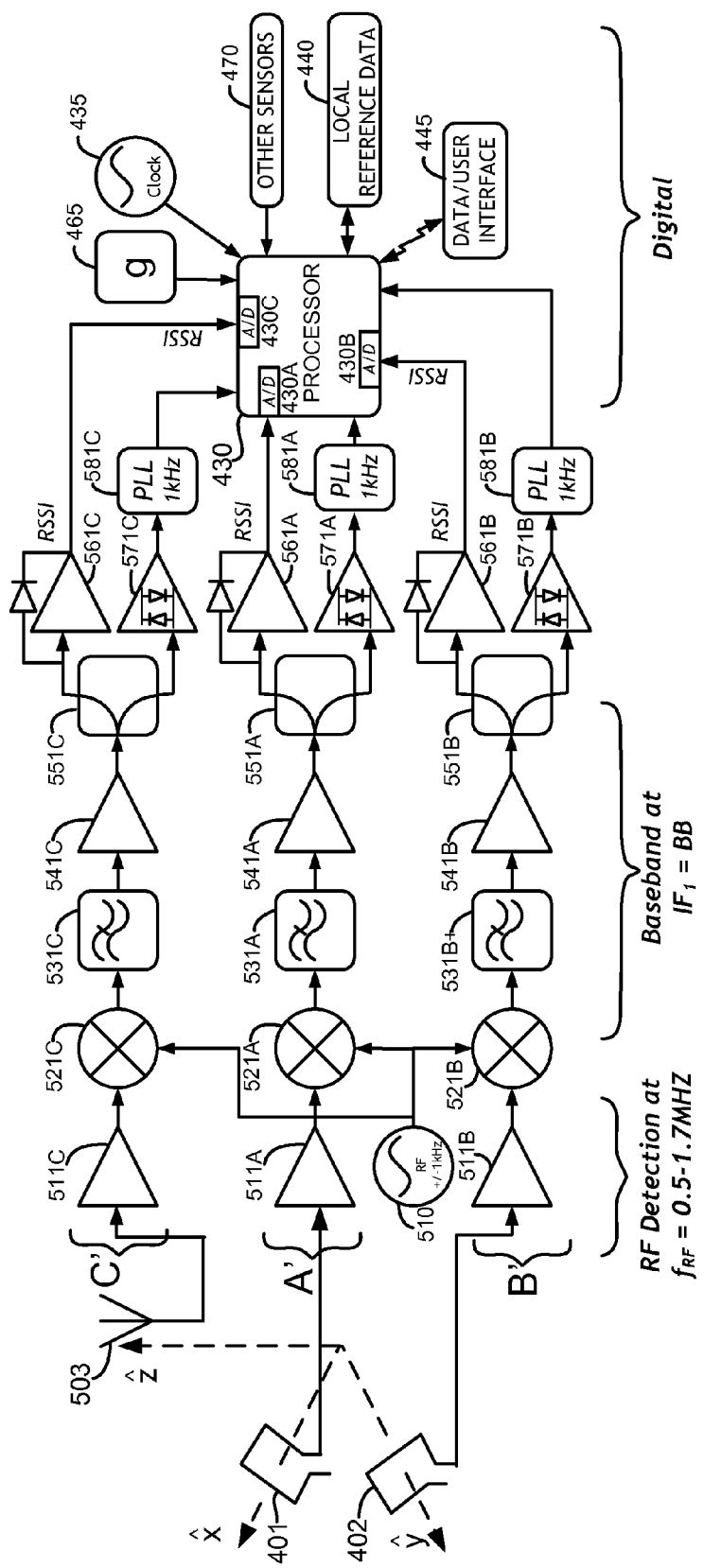
FIG. 5 is a block diagram of a direct conversion signal-of-opportunity detector (SOLD).

FIG. 5 is a block diagram of a direct conversion signal-of-opportunity location detector (SOLD) 500. SOLD 500 of FIG. 5 includes several components in common with SOLD 400 of FIG. 4. Like numbers indicate like components when comparing the components of FIG. 5 with the components of FIG. 4. More particularly, SOLD 500 includes magnetic antennas 401, 402, processor 430, local reference data store 440, data/user interface 445, accelerometer 465, clock 435 and other sensors 470 in common with SOLD 400.

SOLD 500 includes magnetic field channels A' and B' coupled to magnetic antennas 401 and 402, respectively. SOLD 500 also includes an electric field channel C' coupled to electric field antenna 503. Magnetic field channel A' includes an RF preamplifier 511A that couples to a direct conversion mixer 521A. Local oscillator 510 also couples to mixer 521A such that mixer 521A directly down converts the received signal ($f_{RF}$=0.5-1.7 MHz) to a baseband (BB) signal that exhibits a frequency $IF_1$. A low pass filter 531A couples to the output of mixer 521A to filter the baseband signal. An amplifier 541A couples to low pass filter 531A to amplify the filtered baseband signal. A signal splitter 551A couples to the output of amplifier 541A to spilt the amplified, filtered baseband signal into two signal paths, as shown. A limiting amplifier 571A and phase lock loop (PLL) 581A couple between one output of splitter 551A and an input of processor 430, as shown. In this manner, received signal information is provided to processor 430 that is useful for phase tracking and determining of signal characteristics information by processor 430. A log amplifier 561A couples between the other output of splitter 551A and A/D converter input 430A of processor 430 to provide RSSI information to processor 430.

Magnetic field channel B' includes several components analogous to components of magnetic field channel A'. These components are similarly numbered except with a B designation following the component number. More particularly, magnetic field channel B' includes a preamplifier 511B, mixer 521B, low pass filter 531B, amplifier 541B, splitter 551B, log amplifier 561B, limiting amplifier 571B and PLL 581B. PLL 581B provides the down-converted baseband signal BB to processor 430. Amplifier 561B provides a received signal strength indicator (RSSI) signal to analog to digital (A/D) converting input 430B of processor 430.

Electric field channel C' couples to a vertical, electric field antenna 503 and includes several components analogous to components of magnetic field channel A' and magnetic channel B'. These components are similarly numbered except with a C designation following the component number. More particularly, magnetic field channel C' includes a preamplifier 511C, mixer 521C, low pass filter 531C, amplifier 541C, splitter 551C, log amplifier 561C, limiting amplifier 571C and PLL 581B. PLL 581C provides the down-converted baseband signal BB to processor 430. Amplifier 561C provides a received signal strength indicator (RSSI) signal to analog to digital (A/D) converting input 430C of processor 430.

Log amplifier 561C provides an amplitude (RSSI) signal to processor 430 while limiting amplifier 571C captures timing data to enable measurement of the phase response by processor 430. In one embodiment, SOLD 500 may be situated in a moving vehicle that is outfitted with two orthogonal magnetic antennas such as antennas 401, 402 and a vertical whip antenna such as electric field antenna 503. By employing such co-located magnet field and electric field antennas, SOLD 500 may employ local variation in field impedance (i.e. the ratio of electric to magnetic field intensity) as geo-location data for reference data set 440.

Figure 6:
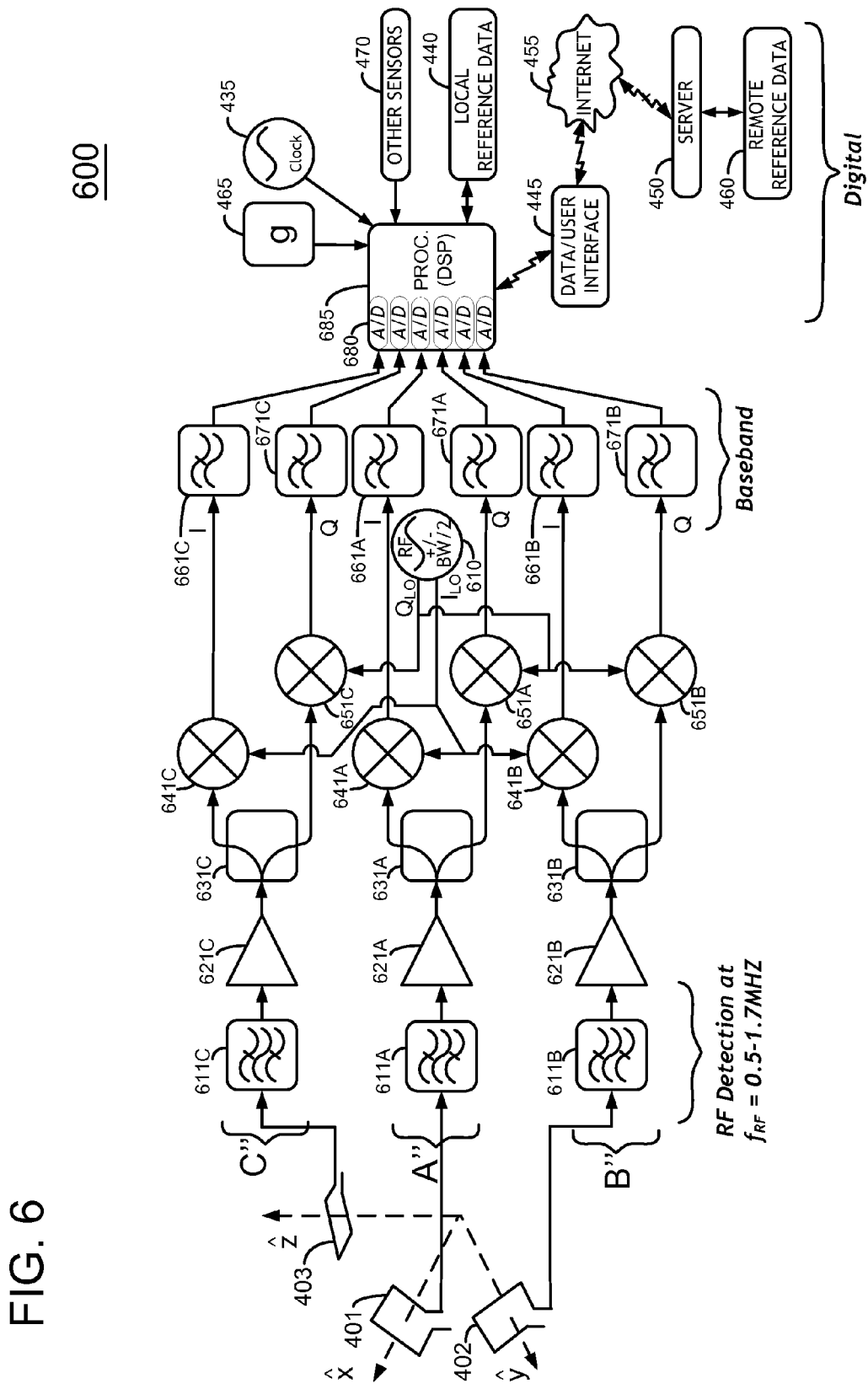
FIG. 6 is a block diagram of quadrature digital signal processing (QDSP) SOLD.

FIG. 6 shows another embodiment of the disclosed signal-of-opportunity location detector (SOLD) as quadrature digital signal processing (QDSP) SOLD 600. SOLD 600 of FIG. 6 includes several components in common with SOLD 400 of FIG. 4. Like numbers indicate like components when comparing the components of FIG. 6 with the components of FIG. 4. More particularly, SOLD 600 includes magnetic field antennas 401, 402 and 403, processor 685, local reference data store 440, data/user interface 445, accelerometer 465, clock 435, other sensors 470, Internet 455, server 450, and remote reference data 460 in common with SOLD 400.

QDSK SOLD 600 digitizes a broad swath of the standard broadcast band at a time. QDSP SOLD 600 may monitor not only AM standard broadcast signals but also detect weaker noise sources that provide useful geo-location information. QDSP SOLD 600 includes 3 magnetic field channels A", B" and C" coupled to magnetic antennas 401, 402 and 403, respectively. In magnetic field channel A", magnetic field antenna 401 couples to a bandpass filter 611A that provides pre-filtering. An amplifier 621A coupled to bandpass filter 611A provides amplification to the pre-filtered signal. A splitter 631A, coupled to the output of amplifier 621A, splits the amplified, pre-filtered signal into two signals that are supplied to respective inputs of I channel mixer 641A and Q channel mixer 651A. A local oscillator 610 provides in-phase ($I_{LO}$) and quadrature ($Q_{LO}$) signals to other respective inputs of mixers 641A and 651A. In this manner, I channel mixer 641A provides a mixed I channel signal and Q channel mixer 651A provides a mixed Q channel signal to filters 661A and 671A, respectively. Filters 661A ad 671A provide filtered, mixed I channel and Q channel signals to respective A/D converters 680 in digital signal processor (DSP) 685. Respective A/D converters 680 digitize the filtered, mixed I channel and Q channel signals and supply the resultant digitized I and Q signals to DSP 685. DSP 685 performs signal processing operations on the digitized I and Q signals. DSP 685 performs operations such as digital down conversion to baseband and additional channel filtering. DSP 685 stores the resultant signal characteristics information in local reference data store 440. This signal characteristics information may include amplitude information, amplitude differences information or phase differences information, as in the embodiments discussed above, for each calibration location at which QDSP SOLD 600 takes a signal characteristics reading. After building a database in local reference data store 440, QDSP SOLD 600 may be moved in the propagation environment previously sampled and again take signal characteristics readings. These signal characteristics readings are compared with the signal characteristics information in local reference data store 440 to obtain the best match. The best match corresponds to the current location of QDSP SOLD 660. In this manner, QDSP determines its current location. QDSP SOLD 600 may interpolate among a plurality of close location matches to determine the current location for greater accuracy.

Magnetic field channels B" and C" have topologies similar to that of magnetic field channel A" discussed above and therefore will not be discussed in detail. For convenience, magnetic field channel B" employs the same component numbers as magnetic field channel A", except with the designation B at the end of the component number. Likewise, magnetic field channel C" employs the same component numbers as magnetic field channel A", except with the designation C at the end of the component number. In this embodiment, all three magnetic field channel channels cooperate with DSP 685 to obtain signal characteristics information descriptive of the current location of SOLD 600.

Figure 7:
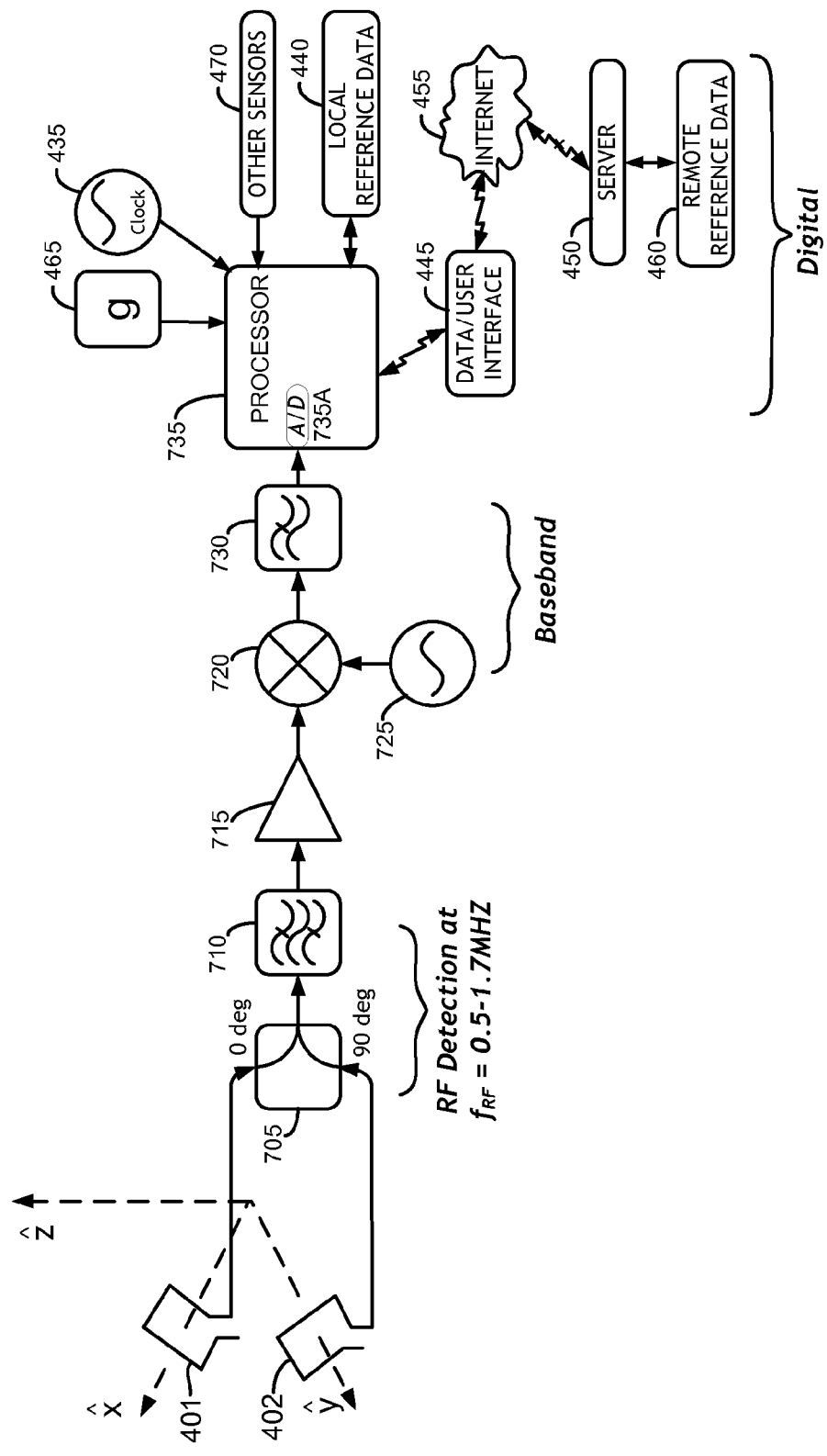
FIG. 7 shows a SOLD direct conversion architecture that employs dual magnetic antennas.

FIG. 7 shows a SOLD direct conversion architecture that employs dual magnetic antennas. More particularly, SOLD 700 includes co-located orthogonal magnetic field antennas 401 and 402 that feed a two input analog quadrature combiner 705. Quadrature combiner 705 merges or combines the signals from magnetic antennas 401 and 402. The output of quadrature combiner 705 couples to a bandpass filter 710 that filters the combined signal. Amplifier 715 amplifies the resultant filtered signal and supplies the amplified signal to one input of mixer 720. The remaining input of mixer 720 couples to local oscillator 725 which is set to an appropriate frequency to enable mixer 720 to perform direct conversion of the received signal to baseband. Low pass filter 730 filters the resultant baseband signal and supplies the filtered baseband signal to an analog to digital converter input 735A of processor 735. Processor 735 processes the baseband signal it receives into signal characteristics information that is either stored in local reference data store 440 as calibration information in "calibration mode" or matched with existing signal characteristics information in local reference data store 440 to determine location in "location detection mode". In this embodiment, SOLD 700 utilizes signal amplitude as the only signal characteristic for obtaining a location solution. SOLD 700 is thus a simpler and less expensive to implement embodiment of the teachings of the present invention. SOLD 700 will tend to provide less accurate location solutions than other SOLD embodiments that employ additional signal characteristics such as phase differences or amplitude difference either by themselves or in conjunction with signal amplitude.

FIG. 8 is a flowchart that illustrates a representative "calibration mode" on the left side and a representative "location detection mode" on the right side. In "calibration mode", process flow commences at start block 800. The steps depicted in the flowcharts herein are not necessarily performed in the order drawn. A user places a signal-of-opportunity location detector (SOLD), such as SOLD 400, 500, 600 or 700, at a point $P_i$ with an orientation of $\phi_1$, as per block 805. A distant transmitter generates a signal-of-opportunity at a frequency of $f_j$, as per block 810. For example, a standard broadcast AM station transmits a signal on 550 KHz. The local environment near the SOLD perturbs the signal-of-opportunity, as per block 815. For example, nearby buildings, electric power lines or other structures interact with the signal.

The SOLD receives the perturbed signal-of-opportunity at a frequency of $f_j$, as per block 820. The SOLD stores reference data that characterizes the received signal as signal characteristics information in a reference data store 835, as per block 825. In this flowchart, reference data block 835 represents the reference data store conceptually. The reference data store represented by block 835 stores the signal characteristics information that is gathered in calibration mode as the SOLD changes from frequency to frequency at a particular location. The signal characteristics information may be stored together with the corresponding location information in table form within reference data store 835. The stored location information may include information with respect to the spatial orientation of the SOLD at each location. This information may be obtained from an accelerometer, gyro, or magnetic compass included in other sensors 470. After storing the signal characteristics information gathered at frequency $f_j$, the SOLD performs a test to see if there are other frequencies within the particular band of interest to be tested, as per decision block 830. If there are other frequencies remaining to be tested, then the SOLD advances to the next frequency, and process flow continues back to block 810. The SOLD gathers signal characteristics information for a station at this new frequency and stores this information in reference data store 835. Using this technique, SOLD may gather a large amount of information useful for geo-location, by advancing from frequency to frequency across the band to collect signal characteristic information for each frequency being correlated with a particular location in the reference data store.

After collection of signal characteristics information at all desired frequencies, process flow continues to decision block 840 at which the SOLD tests to determine if other locations remain to be tested for calibration purposes, as per decision block 840. If other locations remain to be tested, then the SOLD increments to the next $P_i$ position. More particularly, if other locations remain to be tested in the particular propagation environment, then the SOLD moves to the next location and cycles again through the frequencies of interest, gathering and storing signal characteristics information for each of those frequencies. This process continues until signal characteristics information has been gathered for all locations of interest in the particular propagation environment. The calibration process then ends, as per block 845.

Once the calibration process is complete and the signal characteristics information is stored in reference data store 835, the stored signal characteristics information may be used in "location detection mode" to locate the SOLD as it moves from place to place in the particular propagation environment. "Location detection mode" begins on the right side of the flowchart of FIG. 8 at start block 850. The SOLD is situated at location P with an orientation φ, as per block 855. The distant transmitter generates a signal-of-opportunity at a frequency of $f_j$ in the local propagation environment, as per block 860. The local environment near the SOLD perturbs the signal-of-opportunity, as per block 865. As they did in calibration mode, the same nearby buildings, electric power lines or other obstructions interact with the signal to cause this perturbation. The SOLD receives the perturbed signal-of-opportunity at a frequency of $f_j$, as per block 870.

The SOLD extracts signal characteristics information from the received signal at the frequency $f_j$ and compares this signal characteristics information with the signal characteristics information in the reference data store 835 to find the closest match. The location corresponding to the closest match between the current signal characteristics information and the signal characteristics information in the reference data store represents the current location of the SOLD, as per block 875. After completing this matching for one received frequency, the SOLD cycles through other frequencies of interest, as per decision block 880. This same matching test is performed by the SOLD for other frequencies of interest in the particular propagation environment that reference data store 835 covers. In other words, for each of the frequencies of interest that reference data base 835 stores for a particular propagation environment or region, the SOLD matches the received signal characteristics information with the stored signal characteristics information for that frequency to determine the best match current location at that frequency. Ideally, the locations determined by the matching process at each frequency should refer to the same location. In one alternative embodiment, the SOLD may determine the current location to be the location to which the majority of the matches indicate, or employ other selection criteria. While the matching process may be conducted while the SOLD is cycling through the various frequencies, in an alternative embodiment the SOLD may wait until signal characteristics information is determined for all frequencies before performing the matching process to find the current location. In such an embodiment, the order of determine location block 875 and next frequency block would be inverted. In that case, when the SOLD completes its cycling though of the frequencies of interest in the particular propagation environment and determines the current location, the location detection process ends at block 890.

FIG. 9 is a flowchart that shows a preferred calibration methodology for the disclosed SOLD. Process flow commences at start block 900. A SOLD acting as a reference receiver is placed at a location or point $P_i$ exhibiting an orientation of $\phi_i$, as per block 905. The SOLD is within the near field distance of a perturber in the local propagation environment or region. A distant transmitter generates a signal-of-opportunity at a frequency of $f_j$, as per block 910. The SOLD is situated at a far field distance from the transmitter, but within near field distance of the local perturber. The local propagation environment perturbs the signal from the transmitter, as per block 915.

The SOLD receives the signal from the transmitter at frequency $f_j$, as per block 920. The SOLD detects a first signal at frequency $f_j$, as per block 925, and detects a second signal at frequency $f_j$, as per block 930. In one embodiment, the first and second signals may be different polarizations of the same RF signal, i.e. different components of the same RF signal. In one embodiment, the SOLD detects a first signal characteristic such as a first signal amplitude at frequency $f_j$, as per block 935. Signal amplitude is an example of one signal characteristic that the SOLD may determine. Other embodiments may detect other signal characteristics such as signal phase. The SOLD also detects a second signal characteristic such as second signal amplitude at frequency $f_j$, as per block 940. The SOLD measures a difference between the first and second signal amplitudes at frequency $f_j$, as per block 945, to provide a difference value or delta. Alternatively, if the SOLD detects signal phase at blocks 925 and 930, then the SOLD measures a phase difference at block 945. The teachings herein with respect to using the signal characteristic of amplitude to determine location apply as well to using the signal characteristic of phase to determine location. In the discussion below, where the term amplitude is used, the term phase may be used instead.

The SOLD stores first and second signal amplitudes (or first and second signal phases) and the difference value as reference data for each calibration location point $P_i$ with orientation $\phi_i$ and frequency $f_j$, as per block 950. The SOLD may store this information in matrix form such as depicted by matrices 951, 952 and 953. More specifically, matrix 951 stores the first signal amplitude (or phase) as $|S_1|_{i,j}$ for each calibration location point $P_i$ with orientation $\phi_i$ and frequency $f_j$. Matrix 952 stores the second signal amplitude (or phase) as $|S_2|_{i,j}$ for each calibration location point $P_i$ with orientation $\phi_i$ and frequency $f_j$. Matrix 953 stores the difference value as $|\Delta_{12}|_{i,j}$ for each calibration location point $P_i$ with orientation $\phi_i$ and frequency $f_j$. Location point $P_i$ and orientation $\phi_i$ may be determined by a user and indicated via a GUI such as GUI 335. Alternatively, location point $P_i$ and orientation $\phi_i$ may be determined by an inertial system such as an accelerometer, gyro, or magnetic compass included in other sensors 470. The particular orientation of the SOLD at each location may be stored as part of the location information in the reference data.

After collecting and storing the first signal amplitude (or phase), second signal amplitude (or phase) and difference value at one frequency for a particular location $P_i$ and orientation $\phi_i$, the SOLD tests to determine if there are more frequencies left in the band of interest for which to gather reference data for the current location, as per decision block 955. If there are more frequencies left to test at this location, then process flow continues back to block 910 and the SOLD gather reference data for the next frequency increment. The SOLD keep advancing or incrementing to the next frequency until reference data is collected for all frequencies of interest within a particular band at the particular location. When reference data collection is complete for one calibration location, the SOLD moves or is moved to a next location of interest within the propagation region and the reference data collection process is repeated. The reference data collection process is repeated for all locations of interest within the propagation region until the SOLD determines that there are no more locations $P_i$ for which to gather reference data, as per decision block 960. The calibration and reference data collection process then ends at end block 965.

More information is provided with respect to methodology for calibrating a near field electromagnetic position system in commonly assigned U.S. Pat. No. 7,298,314, by Schantz, et al, entitled "Near Field Electromagnetic Positioning System and Method", issued Nov. 20, 2007, the disclosure of which is incorporated herein by reference in its entirety. In alternative embodiments where an adequate geospatial description of perturbers exists for a particular propagation environment, it may be possible to analytically or numerically derive or predict suitable calibration data for a particular propagation environment without performing a calibration process such as described in FIG. 9.

FIG. 10 is a flowchart that shows a preferred location detection methodology for the disclosed SOLD. Process flow commences at start block 1000. The SOLD moves to a location or point $P_i$ exhibiting an orientation of $\phi_i$ within a particular propagation environment, as per block 1005. Location calibration for this propagation has already been conducted and reference data collected. The user of the SOLD desires to know the location of the SOLD within the particular propagation environment. A distant transmitter generates a signal-of-opportunity at a frequency of $f_j$, as per block 1010. The SOLD is situated at a far field distance from the transmitter, but within near field distance of a local perturber. The local propagation environment perturbs the signal from the transmitter, as per block 1015.

The SOLD receives the signal from the transmitter at frequency $f_j$, as per block 1020. The SOLD detects a first signal at frequency $f_j$, as per block 1025, and detects a second signal at frequency $f_j$, as per block 1030. In one embodiment, the first and second signals may be different polarizations of the same RF signal. In one embodiment, the SOLD detects a first signal amplitude at frequency $f_j$, as per block 1035. Signal amplitude is an example of one signal characteristic that the SOLD may determine. Other embodiments may detect other signal characteristics. The SOLD also detects a second signal amplitude at frequency $f_j$, as per block 1040. Alternatively, instead of detecting signal amplitude as the signal characteristic, the SOLD may detect signal phase as the signal characteristic. The SOLD measures a difference between the first and second signal amplitudes (or phases) at frequency $f_j$, as per block 1045, to provide a difference value or delta. This action effectively compares the first and second signal amplitudes (or phases). The first signal amplitude, second signal amplitude and difference value are examples of signal characteristics information.

For the frequency $f_j$ that the SOLD currently receives, the SOLD retrieves the location information from the reference data store that corresponds to the first and second signal amplitudes (or phases) and difference value, thus providing retrieved location information 1051, 1052 and 1053, as per block 1050. The SOLD increments or advances to the next frequency of interest in the calibrated propagation environment, as per decision block 1055, and repeats the reception and signal detection process at the next frequency. As the SOLD cycles through all the frequencies of interest for which the SOLD is calibrated in the particular propagation environment, the SOLD retrieves from the reference data store location information corresponding to the signal characteristics information it determines at each of those frequencies. The SOLD uses the retrieved location information to determine the location that most closely matches the signal characteristics information for the current location, as per block 1060. Applicants have discovered a variety of methods to determine location using calibration methods. These include finding a least-square-error match to a location within a calibration set, finding a least-square-error match to an interpolated point within a calibration set, and other methods more fully described in commonly assigned U.S. Pat. No. 7,298,314, issued Nov. 20, 2007, entitled "Near-field Electromagnetic Positioning System And Method", the disclosure of which is incorporated herein by reference in its entirety. Additional calibration details are provided in commonly assigned U.S. Pat. No. 7,592,949, issued Sep. 22, 2009, entitled "Near-Field Electromagnetic Positioning Calibration System And Method", the disclosure of which is incorporated herein by reference in its entirety. Still further details of this calibration approach to location are provided in commonly assigned U.S. patent application Ser. No. 12/563,960, filed Sep. 21, 2009 entitled "Near-Field Electromagnetic Positioning Calibration System And Method", the disclosure of which is incorporated herein by reference in its entirety. Upon determination of the current location of the SOLD, process flow ends at end block 1065.

Figure 11:
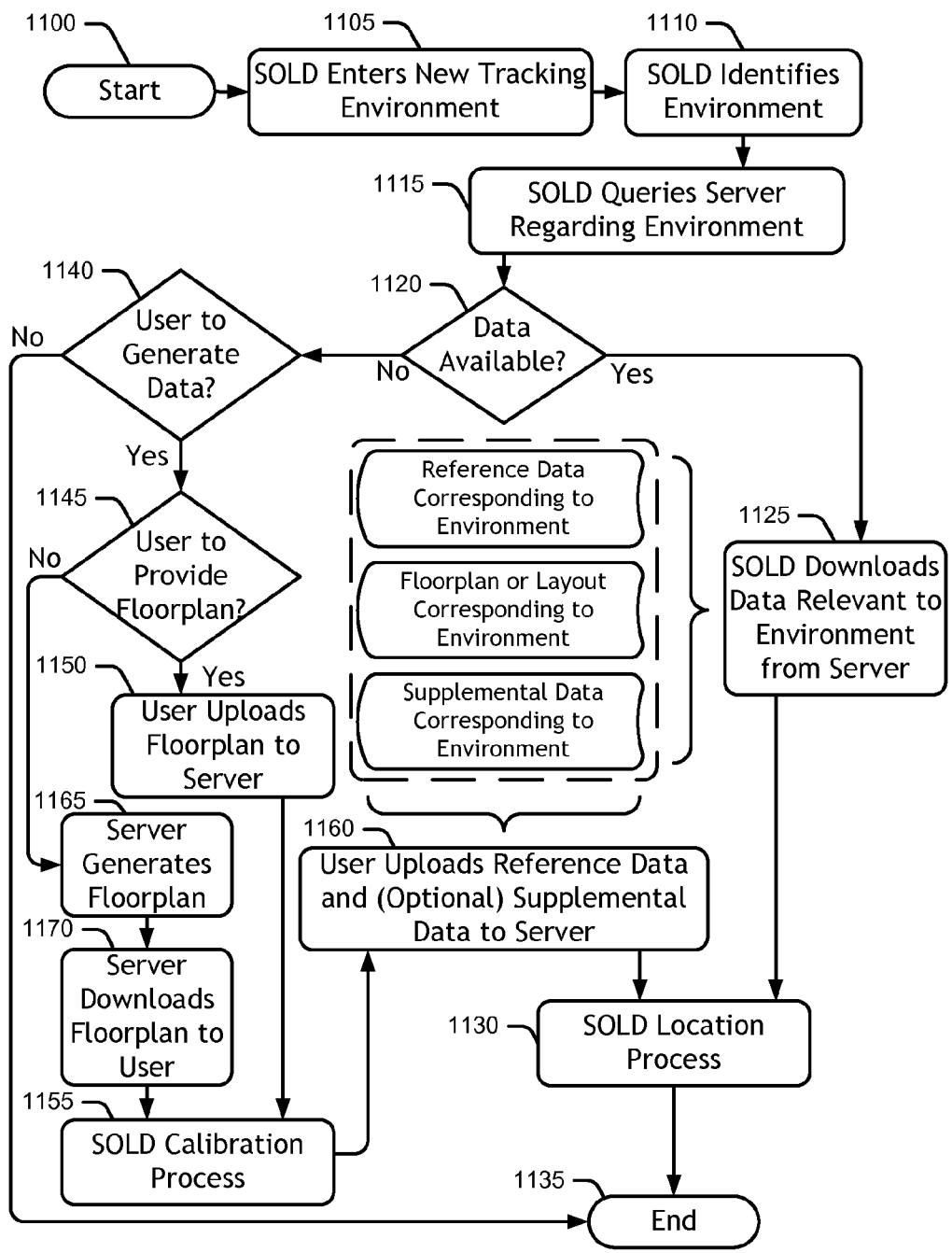
FIG. 11 is a flowchart that shows a process for calibrating the disclosed SOLD when it enters a new tracking environment.

FIG. 11 is a flowchart that shows a process for calibrating the disclosed SOLD when it enters a new tracking environment, i.e. a propagation environment in which it is not already calibrated. This process addresses the situation where the SOLD contains no reference data for the new tracking environment in its local on-board data store and a remote data store contains no reference data that the SOLD may access for the new tracking environment. This process further addresses a situation in which the SOLD contains no reference data for the new tracking environment in its local onboard data store and a remote data store does contain reference data that the SOLD may access for the new tracking environment.

Process flow begins at start block 1100. The SOLD enters a new tracking environment, namely a new propagation environment region, as per block 1105. The SOLD identifies the environment, as per block 1110. For example, the SOLD may monitor local Wi-Fi nodes to determine its environment or approximate location. The SOLD may enter a building with a Wi-Fi network and acquire the MAC address of a network node in the building. The SOLD may then consult a local or remote database to learn that this MAC address corresponds to "City Shopping Mall", i.e. the new tracking environment. The SOLD queries a remote server for reference data for this tracking environment, as per block 1115. More particularly, the SOLD performs a test to determine if the server already stores reference data, i.e. calibration data, for this particular tracking environment, as per block 1120. If the remote server does contain reference data for this tracking environment, then the SOLD downloads reference data relevant to the tracking environment from the server, either wirelessly or by wire depending on the particular application, as per block 1125. After downloading the reference data for the current tracking environment, the SOLD determines the current location using the SOLD location process of the flowchart of FIG. 8 or FIG. 10, as per block 1130. Once the current location is determined, process flow ends at end block 1135.

However, if at decision block 1120, the SOLD finds that no reference data is available for the current tracking environment or propagation environment, the SOLD queries the user to determine if the user desires to have the SOLD generate reference data, i.e. calibration data, for the new environment, as per decision block 1140. If the user does not elect to have the SOLD self generate reference data for the new tracking environment, then the process ends at and block 1135. However, if the user elects to have the SOLD self-calibrate and generate reference data for the new tracking environment, then the SOLD enters a calibration mode wherein the SOLD queries the user to determine if the user will provide a floor plan, as per block 1145. For example, the SOLD may query the user to determine if the user has available a floor plan of the "City Shopping Mall" or other building that is the current propagation environment.

If the user has a floorplan or map of the propagation environment available, then the user uploads the floorplan of the propagation environment to a server, as per block 1150. A floorplan includes maps, diagrams, charts, aerial photography, satellite photography or other graphical representation of geographic data. After obtaining the floorplan, the SOLD then performs self-calibration as per the calibration method of the FIG. 8 flowchart or the FIG. 9 flowchart, as per block 1155. The user uploads the reference data or calibration data thus obtained to the server, per block 1160. Optional supplemental information may accompany the reference data, such as the names of stores at different locations within the "City Shopping Mall", or other commercial on non-commercial information descriptive of locations on the floorplan. The supplemental data may also include the time at which the calibration data were collected. The server may store the optional supplemental information along with the signal characteristics information for each location in the floorplan. Once the reference data for the new tracking environment is uploaded to the server for storage, another user or the same user may use a SOLD to determine locations within the tracking environment, as per block 1130.

If at decision block 1145 the user does not have a floorplan available for the new tracking or calibration environment, then the remote server may generate the floorplan, as per block 1165. The remote server may be situated outside of the tracking environment. The server may generate the floorplan, as per block 1165, by accessing one of many aerial/satellite image programs or other geospatial databases that show building shapes available via the Internet to obtain at least in image of the exterior of the building in the new tracking environment for which interior location detection is desired. The server downloads the floorplan to the SOLD, as per block 1170, for use as an initial floorplan. The SOLD then conducts the SOLD calibration process of the FIG. 8 or FIG. 9 flowcharts, as per block 1155. As before, the SOLD uploads the reference data for the new tracking environment to the server, as per block 1160. The SOLD location process is performed when desired, as per block 1130, and the process ends at end block 1135. In this manner, users may assist other users by self-generating reference data for new tracking environments and uploading the reference data to the server for use by other SOLD users. It is noted that a coarse calibration may be possible in a rural propagation environment where there are relatively few perturbers.

Figure 12:
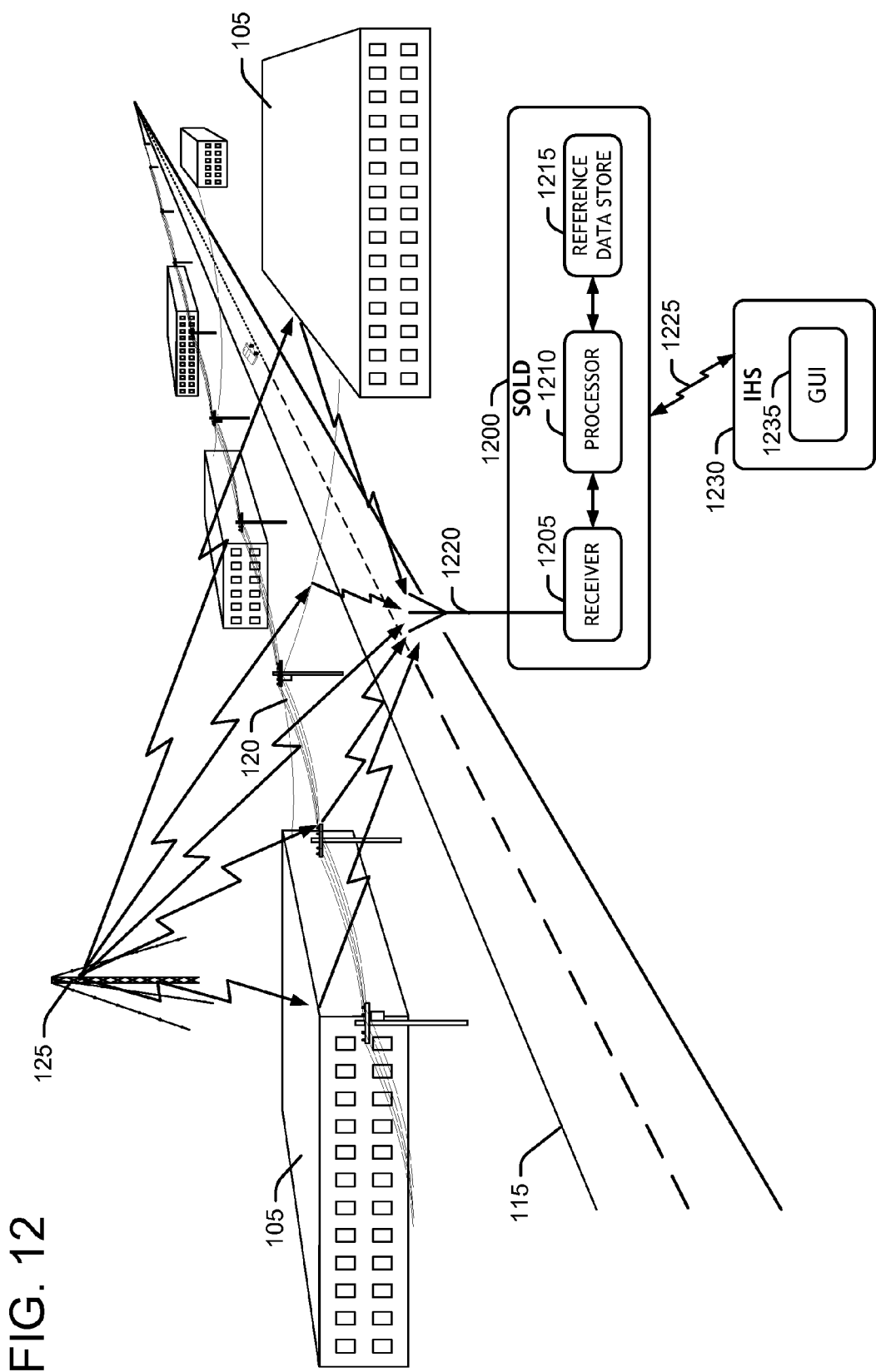
FIG. 12 shows a simplified block diagram of another signal-of-opportunity location detector (SOLD) configuration.

FIG. 12 shows another simplified block diagram of a Signal-of-Opportunity Location Detector (SOLD) as SOLD 1200. A signal-of-opportunity interacts with an urban or other tracking environment, coupling to and being perturbed by scatterers including buildings, electric lines, soil or ground, and other conducting objects. SOLD 1200 includes at least one antenna 1220 or field probe, at least one receiver 1205, and a processor 1210 capable of accessing a suitable reference data set 1215. Antenna 1220 and receiver 1205 detect a perturbed signal-of-opportunity to generate a received signal. Processor 1210 compares at least one received signal to a reference data set so as to derive a location solution. In a preferred embodiment, a processor 1210 compares data pertinent to a plurality of received signals to each other and employs the plurality of received signals and the resulting comparisons to calibrate a location system or to derive location solutions. In FIG. 12, an optional data link 1225 (preferably a wireless data link such as a Wi-Fi, Bluetooth, NFC, IR, or other data link) enables a data connection to a secondary device, namely remote information handling system (IHS) 1230 including a graphical user interface (GUI) 1235. IHS 1230 is typically co-located with SOLD 1200 and includes apparatus that enables a user to interact with SOLD 1200 including but not limited to controlling the SOLD, changing settings of the SOLD, modifying behavior of the SOLD, providing inputs to the SOLD, and receiving visual, auditory, or tactile feedback from the SOLD. This IHS may be a personal data assistant (PDA), "Smart Phone," laptop, notebook, computer, or other form factor device suitable for interaction with the SOLD. The IHS 1230 may enable a user to input location on a map, layout, or floor plan of a tracking environment as part of the SOLD calibration process.

In one embodiment, when operating in "calibration mode" the SOLD may collect and store single component information in the reference data store for each location. For example, the single component information may be an amplitude or RSSI value for a particular polarization component of the received signal at a particular location. In more detail, the single component information may be an RSSI value for the horizontal polarization of the received signal derived by reception from a magnetic antenna, for example. Alternatively, the single component information may be an amplitude value for the vertical polarization of the received signal derived by reception from an electric antenna, for example. In one embodiment, for each location, the reference data may include the above described single component information for each of the frequencies of interest in the frequency band during calibration. This increase in available reference data enhances the accuracy of location determination.

Figure 13:
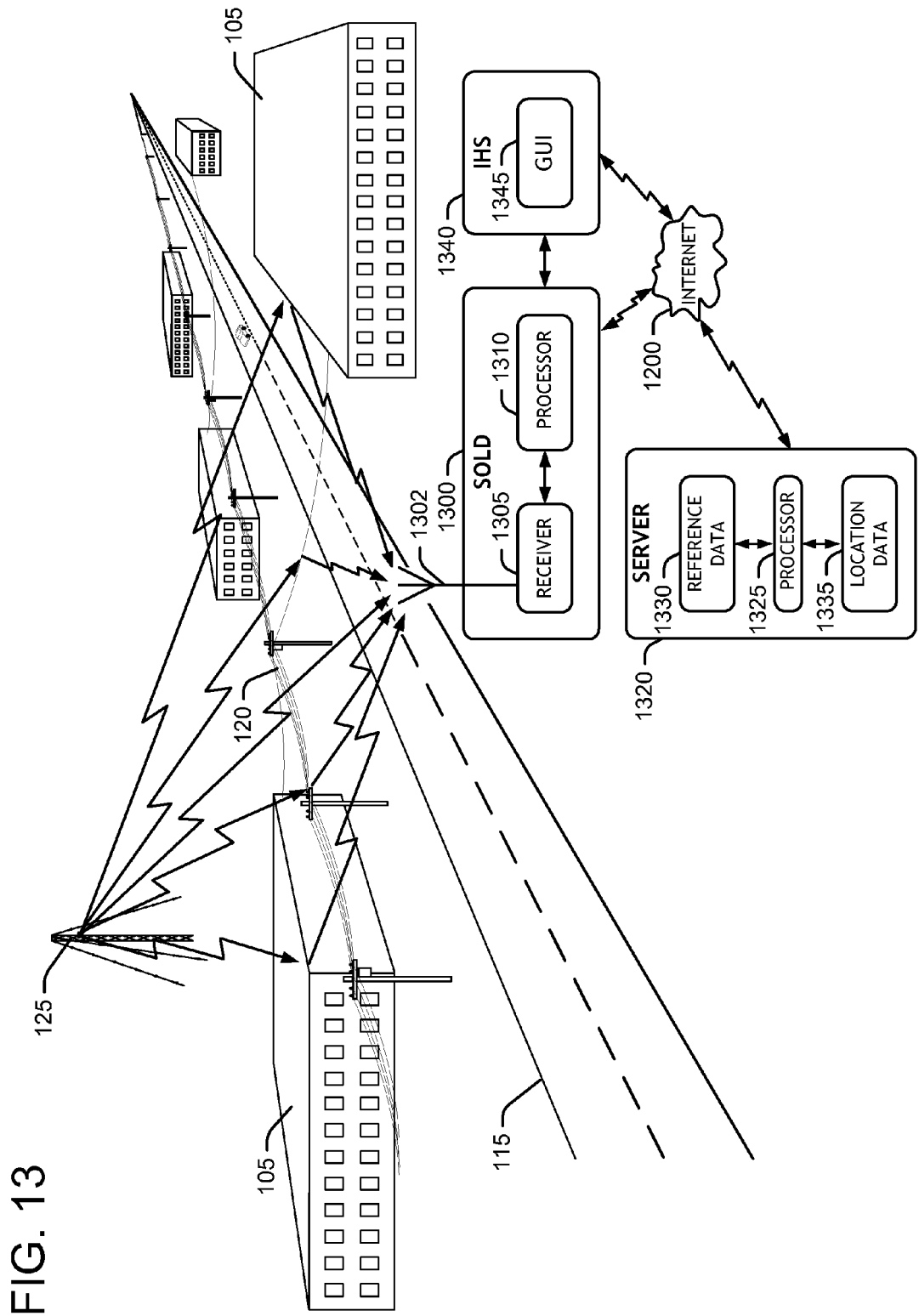
FIG. 13 shows a block diagram of another simplified SOLD configuration.

FIG. 13 shows a block diagram of another simplified SOLD 1300 that includes at least one antenna 1302 or field probe, at least one receiver 1305, and a processor 1310. Processor 1310 enables a data connection such as a wireless network, cell phone, or other data network. A data connection may traverse the Internet or other networking or communication system. A data connection enables SOLD 1300 to interface with and exchange data with a remote data center such as server 1320. Remote data center server 1320 includes a processor 1325 and databases such as a reference data database 1330 and a location data database 1335. SOLD 1300 communicates data pertinent to a received signal to remote data center server 1320. Remote data center server 1320 uses data pertinent to a received signal in conjunction with reference data to derive a location solution. Processor 1325 within server 1320 may store location data in location database 1335. Processor 1325 may further enable a secondary device, namely IHS 1340 including GUI 1345, to access location data via a data connection. This secondary device IHS 1340 in this embodiment may not necessarily be co-located with either SOLD 1300 or with remote data center server 1320. SOLD 1300 as depicted in FIG. 13 may be suitable for an application in which a SOLD "tags" a remote asset, vehicle, person, or other object without any requirement for location data to be accessible from within a vicinity or neighborhood of a SOLD tag.

Figure 14:
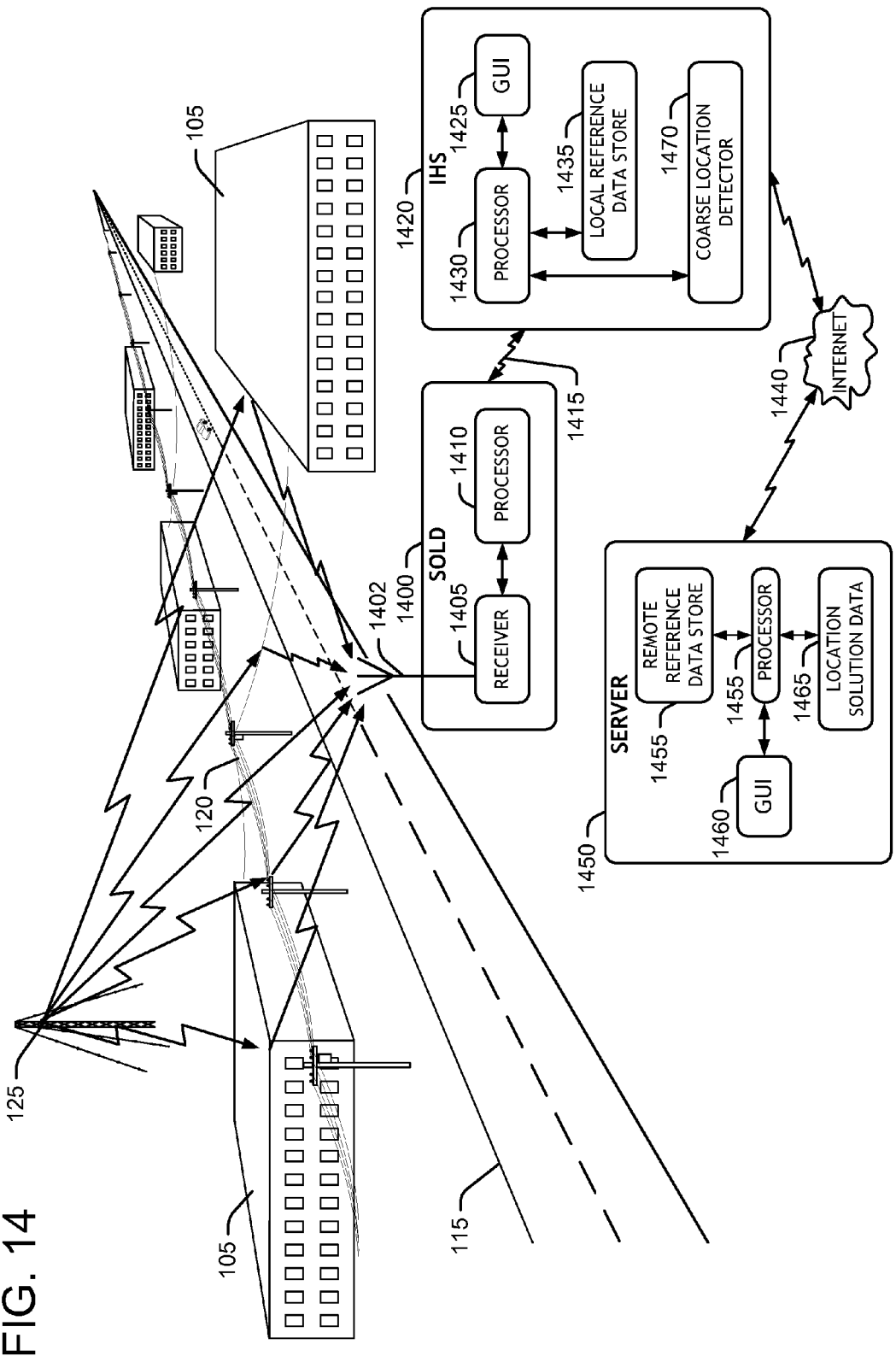
FIG. 14 shows a block diagram of still another simplified SOLD configuration.

FIG. 14 shows a block diagram of another simplified SOLD 1400 that includes at least one antenna 1403 or field probe, at least one receiver 1405, and a processor 1410. Processor 1410 enables a short range data connection 1415 with a co-located secondary device, namely IHS 1420. In one embodiment, co-located IHS 1420 includes a GUI 1425 and a processor 1430 with a local reference data set 1435. Processor 1430 in the co-located IHS 1420 further employs a data connection via the Internet 1440, or other network, with a remote data center server 1450. This data connection enables the co-located IHS 1420 to download reference data from a remote reference data database 1455 at the remote data center server 1450.

This data connection also enables IHS 1420 to upload local reference data 1435, acquired as the product of a calibration process, to the remote data center server 1450. Server 1450 includes a processor 1455 and a GUI 1460. The data connection further enables co-located IHS device 1420 to upload location solution data 1435 to a location solution data base 1465 within remote data center server 1450. The remote data center server 1450 may then make reference data, location solution data, or other relevant data available to other authorized users or clients. In one embodiment, these other users may employ a remote device including a GUI within a display that may show a map, a floor plan, or a diagram of a tracking environment. The display may further show the location of one or more SOLDs, either in real-time or from historical data within location solution data base 1465. The display may further present results derived from location data acquired via SOLD 1400.

It should be understood that the various functional components of a SOLD need not all be contained within a single organic unit. SOLD functionality may be distributed in many different cooperative combinations even beyond the three examples disclosed in FIGS. 12, 13 and 14. A SOLD may derive location solutions within the same single electronic device that generates a received signal, or a co-located electronic device may derive location solutions, or a remote data center or remote server may derive location solutions as well on behalf of the SOLD. Moreover, a SOLD may be implemented as an embedded module within another device. An embedded SOLD may assist, aid, or otherwise enable another device, within which a SOLD is embedded, to perform the functions of that other device. SOLD functionality may further be implemented among co-located devices, or across geographically dispersed devices or data centers. A wide variety of SOLD implementations and architectures are available based on the need for and uses of location data, privacy and data security policies, and other application specific requirements.

One may calibrate the SOLD by a theoretical model of the propagation environment—assuming such factors as ground conductivity, electric line geometries, and building structures are adequately characterized to be the inputs for such a model. Alternatively, by moving the SOLD to various locations in the propagation environment, one may build up a reference or calibration data set for later use. The calibration may be made with reference to an absolute coordinate system obtained through a GPS, inertial, barometric, magnetic compass, or other locating and positioning system.

A sufficiently dense calibration enables an accurate interpolation to cover the intervening area. For instance, one may subdivide the tracking area or tracking environment into triangles at whose vertices lie calibration points using the process of DeLauney triangulation. Each triangle defines a plane within which received parameters such as amplitude, amplitude differences, or phase difference may be readily interpolated from the values at the vertices of the triangle.

Alternatively, a particular path through the propagation environment may be characterized to allow future guidance along the same relative path, with a linear interpolation between calibration points. This approach is attractive for calibrating an inertial location system, for instance. Although a SOLD may not be able to provide an absolute location, it can determine when the device has returned to an earlier location and orientation, allowing whatever drift might have accumulated in an accelerometer or gyro since the time the unit was last at that relative location to be identified and eliminated. In addition, a SOLD may provide relative guidance with respect to a calibrated path even though the absolute location of a calibrated path may be unknown. Such functionality is useful in a variety of applications, including locating emergency responders or others who may be in harm's way.

Moreover, the generally available AM broadcast signals or other signals-of-opportunity may be supplemented by placing low power transmit beacons in and around relevant urban areas, buildings, facilities, or other tracking environments to further enhance the availability of trackable signals. Such supplemental transmit beacons are more fully described in the commonly assigned U.S. Pat. No. 6,963,301, entitled, "System and method for near-field electromagnetic ranging", which is incorporated by reference in its entirety.

In one embodiment, the SOLD may use different reference data signal characteristics information according to the time of day. In the AM standard broadcast band, daytime propagation conditions may be very different from nighttime propagation conditions when more distant signals become stronger due to sky wave propagation. To address this situation, the SOLD can be calibrated with one set of signal characteristics information for daytime operation and another set of signal characteristics information for night time operation. When operating in location detection mode, the SOLD may switch between the daytime and nighttime signal characteristic information in the reference data store at predetermined times each day, in response to the changing propagation conditions. It as also possible to gradually transition between a day mode and a night mode, and vice versa, by employing multiple reference data sets taken during the hours of transition. In another embodiment, different reference data sets may be generated and used for different times or seasons of the year. Similarly, since a SOLD typically employs measurements at multiple frequencies in determining location, if a substantial change has occurred in the signal characteristics measured at one particular frequency, a SOLD can dynamically update its calibration with respect to a signal characteristic obtained at that one particular frequency with respect to the location determined by use of signal characteristics of the remaining frequencies."

Conventional RF fingerprinting techniques rely on correlating measurements of conventional and widely used frequencies (typically VHF, UHF, or higher) to location. Applicants have discovered unique and previously unappreciated advantages for location systems operating at lower frequencies. Lower frequencies offer superior propagation including better penetration and diffraction around obstacles. Longer wavelength signals have phase responses that vary slowly and gradually with respect to distance. Furthermore, lower frequency, longer wavelength signals have near-field zones that extend to much longer distances than those of conventional and widely used frequencies. These factors combine synergistically to offer substantially superior performance than might be expected by a mere extrapolation from performance at conventional higher frequencies.

The disclosed SOLD may be used to supplement the location detection capabilities of other location detections systems when those systems fail or become degraded for a number of reasons. For example, a SOLD may be used in combination with a GPS system. A GPS system excels when it is in a open field signal propagation environment. However, when a GPS system encounters a complex environment such as environment 100 of FIG. 1, GPS location tracking may degrade or fail. A combined SOLD-GPS may provide a failover capability that switches from GPS mode to SOLD mode in response to GPS degradation, GPS failure or in response to the SOLD-GPS entering a complex propagation environment. During both urban and rural calibration outdoors, GPS may be used to identify point $P_i$ in a calibration mode. Thus, a SOLD will be able to take over should a GPS be jammed or otherwise fail.

It is noted that a tracking environment in which the disclosed SOLD may be employed includes a particular urban area, GPS-denied terrain, forest, wilderness, underground, or other outdoor area within and around which location information might be desired or useful. A tracking environment may also be a mall, store, supermarket, superstore, boutique, restaurant, apartment complex, residence, hotel, convention center, or other retail, commercial, or residential establishment within and around which location information might be desired or useful. A tracking environment may also be a factory, assembly line, manufacturing center, warehouse, distribution center, office building laboratory, hospital, or other commercial, business, or industrial facility. Further, a tracking environment may be an airport, car rental facility, train station, bus station, transit yard, subway station, or other transit facility within and around which location information might be desired or useful. Additionally, a tracking environment may be a museum, amusement park, stadium, field, track, theater, arcade, campus, school, or other educational, entertainment, or athletic facility within and around which location information might be desired or useful. In still further applications, a tracking environment may be a prison, correctional facility, military base, office, courthouse, motor pool, library, emergency incident response scene, training facility, or other municipal, county, state, or federal facility within and around which location information might be desired or useful. Examples of potential tracking environments are illustrative only and should not be interpreted to preclude application of the present invention to still further venues within and around which location information might be valuable.

In an alternative embodiment, IHS 1420 of FIG. 14 may include a coarse location detector 1470 that determines a coarse location of IHS 1420 and co-located SOLD 1400. Coarse location detector 1470 may determine the coarse or approximate location of IHS 1420 by using methodology other than SOLD methodology, in one embodiment. While coarse location detector 1470 is represented as a part of IHS 1420 in FIG. 14, coarse location detector 1470 may take many different forms and cooperate with elements outside of IHS 1420 to determine the coarse location or tracking environment of IHS 1420. A wide variety of specific methods are available by which a coarse location detector may identify a particular tracking environment or coarse location. A tracking environment or coarse location may be identified by reference to GPS or other co-located wide area tracking system. A tracking environment or coarse location may also be identified by reference to the MAC address or other unique identifying information of a WiFi, ZigBee, or other wireless network node using a co-located wireless data modem or by reference to an E911 or other cellular location information provided by a co-located mobile wireless system. A tracking environment or coarse location may be identified by user input through a GUI. Alternatively, IHS 1420 may be implemented as a "Smart Phone" or PDA with coarse location determining capabilities. These identification methods are provided for purposes of illustration, not limitation. Upon determining the coarse location of SOLD 1400 by coarse location detector 1470, server 1450 may select reference data corresponding to the coarse location. After completing coarse location detection by one of the methodologies above, the system of FIG. 14 may switch from the above described "coarse-location" mode to a more refined location mode or "fine location mode" wherein SOLD 1400 determines the location of SOLD 1400 using the disclosed SOLD methodology.

Figure 15:
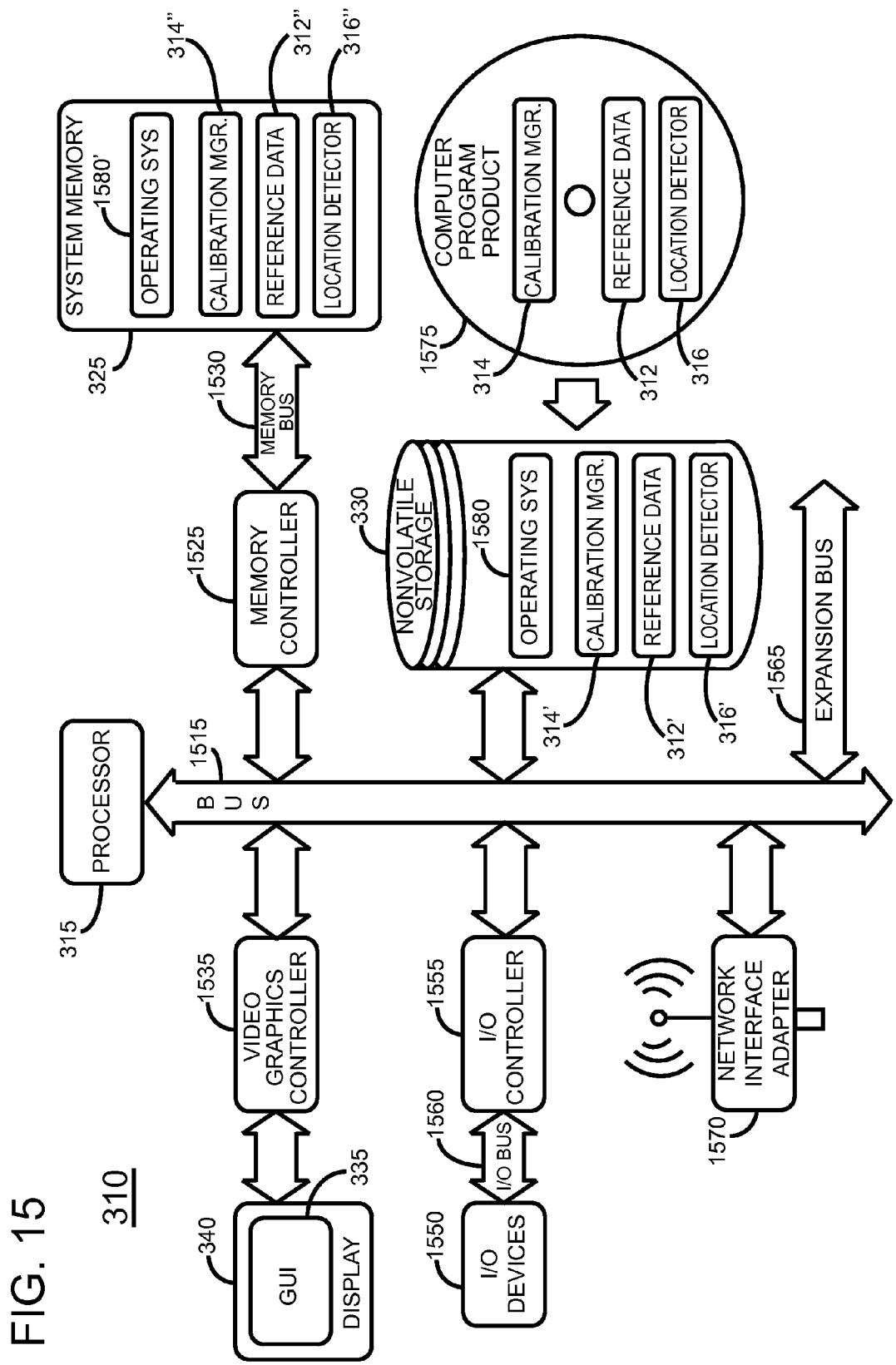
FIG. 15 shows an information handling system (IHS) that may be used as the information handling system (IHS) of the SOLD of FIG. 3.

FIG. 15 shows an information handling system (IHS) that may be used as information handling system (IHS) 310 of the SOLD 300 of FIG. 3. In the particular embodiment of FIG. 3, IHS 310 is embedded within SOLD 300 and includes GUI 335, calibration manager 314, reference data 312 and location detector 316 therein. IHS 310 includes a processor 315 that may include multiple cores. IHS 310 processes, transfers, communicates, modifies, stores or otherwise handles information in digital form, analog form or other form. IHS 310 includes a bus 1515 that couples processor 315 to system memory 325 via a memory controller 1525 and memory bus 1530. In one embodiment, system memory 325 is external to processor 315. System memory 325 may be a static random access memory (SRAM) array or a dynamic random access memory (DRAM) array. A video graphics controller 1535 couples display 340 to bus 1515. IHS 310 generates a graphical user interface (GUI) 335 on display 340. Nonvolatile storage 330, such as a hard disk drive, solid state drive (SSD), CD drive, DVD drive, or other nonvolatile storage couples to bus 1515 to provide IHS 310 with permanent storage of information. I/O devices 1550, such as a keyboard and a mouse pointing device, couple to bus 1515 via I/O controller 1555 and I/O bus 1560.

One or more expansion busses 1565, such as USB, IEEE 1394 bus, ATA, SATA, PCI, PCIE, DVI, HDMI and other busses, couple to bus 1515 to facilitate the connection of peripherals and devices to IHS 310. A network interface adapter 1570 couples to bus 1515 to enable IHS 310 to connect by wire or wirelessly to a network and other information handling systems and devices. In this embodiment, network interface adapter 1570 may also be called a network communication adapter or a network adapter. While FIG. 15 shows one IHS that employs processor 315, the IHS may take many forms. For example, IHS 310 may take the form of a portable, laptop, notebook, netbook, desktop, server or other form factor computer or data processing system. IHS 310 may take other form factors such as a tablet device, pad device, gaming device, a personal digital assistant (PDA), a portable telephone device, a communication device or other devices that include a processor and memory.

IHS 310 includes a computer program product on digital media 1575 such as a CD, DVD or other media. Digital media 1575 includes a calibration manager application 314, a location detector application 316 and reference data 312, the functions of which were described above. In practice, IHS 310 may store calibration manager application 314, location detector application 316 and reference data 312 on nonvolatile storage 330 as calibration manager application 314', location detector application 316' and reference data 312'. Nonvolatile storage 330 also stores an operating system 1580 (OPERATING SYS) to manage overall operation of IHS 310. When IHS 310 initializes, the IHS loads operating system 1580 into system memory 325 for execution as operating system 1580'. IHS 310 also loads calibration manager application 314', location detector application 316' and reference data 312' into system memory 325 as store calibration manager application 314", location detector application 316', and reference data 312".

As will be appreciated by one skilled in the art, aspects of the disclosed location detection methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit" "module" or "system." Furthermore, aspects of the present invention may take the form of a computer program product, such as computer program product 1575 embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIGS. 8, 9, 10 and 11 flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIGS. 8, 9, 10 and 11 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts of FIGS. 8, 9, 10 and 11 described below.

The flowcharts of FIGS. 8, 9, 10 and 11 illustrate the architecture, functionality, and operation of possible implementations of systems, methods and computer program products that perform location determining in accordance with various embodiments of the present invention. In this regard, each block in the flowcharts of FIGS. 8, 9, 10 and 11 may represent a module, segment, or portion of code, which comprises one or more executable instructions for implementing the specified logical function(s). It should also be noted that, in some alternative implementations, the functions noted in the block may occur out of the order noted in FIGS. 8, 9, 10 and 11. For example, two blocks shown in succession may, in fact, be executed substantially concurrently, or the blocks may sometimes be executed in the reverse order, depending upon the functionality involved. It will also be noted that each block of FIGS. 8, 9, 10 and 11 and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of determining location, comprising:
 receiving, by a receiver, a radio frequency (RF) signal-of-opportunity that exhibits a signal component at the receiver, the RF signal-of-opportunity being perturbed by a perturber within the propagation environment of the receiver, the receiver being configured to receive the RF signal-of-opportunity within near field range of the perturber;

detecting, by the receiver, a signal characteristic of the signal component to provide signal characteristic information; and comparing the signal characteristic information with reference data to determine the current location of the receiver.

2. The method of claim 1, wherein the signal component is one of a horizontal polarization, a vertical polarization and a radial polarization of the RF signal-of-opportunity.

3. The method of claim 1, wherein the signal characteristic is a characteristic of an electric field of the RF signal-of-opportunity.

4. The method of claim 1, wherein the signal characteristic is a characteristic of a magnetic field of the RF signal-of-opportunity.

5. The method of claim 1, wherein the signal characteristic is amplitude.

6. The method of claim 1, wherein the RF signal-of-opportunity exhibits first and second signal components at the receiver.

7. The method of claim 6, wherein the detecting step comprises detecting, by the receiver, a first signal characteristic of the first signal component and a second signal characteristic of the second signal component.

8. The method of claim 7, further comprising:
determining signal characteristic comparison information from the first and second signal characteristics; and
comparing the signal characteristic comparison information with reference data to determine the current location of the receiver.

9. The method of claim 8, wherein the determining step further comprises comparing the respective amplitudes of the first signal characteristic and the second signal characteristic to generate the signal characteristic comparison information.

10. The method of claim 8, wherein the determining step further comprises comparing the respective phases of the first signal characteristic and the second signal characteristic to generate the signal characteristic comparison information.

11. The method of claim 8, wherein the determining step further comprises taking the difference between the first signal characteristic and the second signal characteristic to generate signal characteristic comparison information.

12. The method of claim 1, wherein the reference data includes signal characteristic information for each of a plurality of different frequencies in a frequency band of interest at a particular location within the propagation environment.

13. The method of claim 12, wherein the reference data further includes different signal characteristic information and corresponding location information for each of a plurality of different locations within the propagation environment.

14. The method of claim 12, wherein the reference data varies according to the time of day.

15. A method of calibrating a location detector, comprising:
receiving, by a receiver, a first radio frequency (RF) signal-of-opportunity that exhibits a signal component at the receiver, the first RF signal-of-opportunity being perturbed by a perturber within the propagation environment of the receiver, the receiver being configured to receive the RF signal-of-opportunity at a current location within near field range of the perturber;
detecting, by the receiver, a signal characteristic of the signal component to provide signal characteristic information; and
storing, by a reference data store, the signal characteristic information and corresponding location information designating the current location of the receiver, thus providing reference data to the reference data store.

16. The method of claim 15, wherein the first RF signal-of-opportunity is one of a plurality of RF signals-of-opportunity, each RF signal-of-opportunity exhibiting a different frequency within a band of interest and being perturbed by the propagation environment.

17. The method of claim 16, the method further comprising:
repeating the receiving, detecting and storing steps for each RF signal-of-opportunity at their respective different frequencies, thus providing reference data including respective signal characteristic information for each of the RF signals-of-opportunity at their respective different frequencies at the current location of the receiver.

18. The method of claim 17, further comprising:
moving the receiver to a plurality of locations and repeating the receiving, detecting and storing steps at each location to build the reference data store to include signal characteristic information with corresponding location information for each location of the plurality of locations.

19. The method of claim 15, further comprising querying a user to determine if the user desires to perform calibration of the location detector for a propagation environment for which calibration was not previously conducted.

20. A method of determining location comprising:
retrieving, by a mobile receiver from a server, reference data that correlates a plurality of locations with a respective plurality of signal characteristics;
receiving, by the mobile receiver, a radio frequency (RF) signal from a fixed transmitter, the RF signal exhibiting a signal component at the mobile receiver;
detecting, by the mobile receiver, a signal characteristic of the signal component, thus providing signal characteristic information;
comparing the signal characteristic information with the reference data to determine the current location of the mobile receiver;
wherein the receiving, by the mobile receiver, a radio frequency (RF) signal further comprises receiving, by the mobile receiver, a radio frequency (RF) signal-of-opportunity that exhibits a signal component at the mobile receiver, the RF signal-of-opportunity being perturbed by a perturber within the propagation environment of the mobile receiver, the mobile receiver being adapted to receive the RF signal-of-opportunity within near field range of the perturber.

21. The method of claim 20, wherein the signal component is one of a horizontal polarization, a vertical polarization and a radial polarization of the RF signal-of-opportunity.

22. The method of claim 20, wherein the signal characteristic is a characteristic of an electric field of the RF signal-of-opportunity.

23. The method of claim 20, wherein the signal characteristic is a characteristic of a magnetic field of the RF signal-of-opportunity.

24. A method of determining location comprising:
receiving, by a mobile receiver, a radio frequency (RF) signal that exhibits a signal component at the mobile receiver;
detecting, by the mobile receiver, a signal characteristic of the signal component;
transmitting, by the mobile receiver to a server, the signal characteristic;

comparing, by the server, the signal characteristic to reference data, the reference data correlating a plurality of locations with a respective plurality of signal characteristics; and determining, by the server, the location of the mobile receiver from the comparing step, thus providing a determined location of the mobile receiver wherein the receiving, by the mobile receiver, a radio frequency (RF) signal further comprises receiving, by the mobile receiver, a radio frequency (RF) signal-of-opportunity that exhibits a signal component at the mobile receiver, the RF signal-of-opportunity being perturbed by a perturber within the propagation environment of the mobile receiver, the mobile receiver being adapted to receive the RF signal-of-opportunity within near field range of the perturber.

25. A method of determining location comprising:

determining a coarse location;

selecting, from a reference data store, particular reference data corresponding to the coarse location, the reference data store including reference data that correlates a plurality of locations with a respective plurality of signal characteristics, receiving, by a mobile receiver, a radio frequency (RF) signal from a fixed transmitter, the RF signal exhibiting a signal component at the mobile receiver, detecting, by the mobile receiver, a signal characteristic of the signal component, comparing the signal characteristic to the reference data, the reference data correlating a plurality of locations with a respective plurality of signal characteristics, and determining the current location of the mobile receiver employing the comparison;

wherein the receiving, by the mobile receiver, a radio frequency (RF) signal further comprises receiving, by the mobile receiver, a radio frequency (RF) signal-of-opportunity that exhibits a signal component at the mobile receiver, the RF signal-of-opportunity being perturbed by a perturber within the propagation environment of the mobile receiver, the mobile receiver being adapted to receive the RF signal-of-opportunity within near field range of the perturber.

26. The method of claim 25, wherein the signal component is one of a horizontal polarization, a vertical polarization and a radial polarization of the RF signal-of-opportunity.

27. The method of claim 25, wherein the signal characteristic is a characteristic of an electric field of the RF signal-of-opportunity.

28. The method of claim 25, wherein the signal characteristic is a characteristic of a magnetic field of the RF signal-of-opportunity.

29. A method of calibrating a location detector comprising:

determining a coarse location;

querying a server to determine if reference data corresponding to a coarse location are available, the reference data correlating a plurality of locations with a respective plurality of signal characteristics;

querying a user, if reference data corresponding to a coarse location are not available, to determine if a user desires to calibrate the location detector, and if the user does desire to calibrate the location detector, continuing the process with the steps of:

receiving, by a mobile receiver, a first radio frequency (RF) signal-of-opportunity from a fixed transmitter, the first RF signal-of-opportunity exhibiting a signal component at the mobile receiver;

detecting, by the mobile receiver, a signal characteristic of the signal component;

storing, by a reference data store, the signal characteristic information along with respective location information designating the current location of the location detector to provide reference data to the reference data store wherein the receiving, by the mobile receiver, a first radio frequency (RF) signal-of-opportunity comprises receiving, by the mobile receiver, the first radio frequency (RF) signal-of-opportunity that exhibits a signal component at the mobile receiver, the first RF signal-of-opportunity being perturbed by a perturber within the propagation environment of the mobile receiver, the mobile receiver being adapted to receive the first RF signal-of-opportunity within near field range of the perturber.

30. The method of claim 29, wherein the first RF signal-of-opportunity is one of a plurality of RF signals-of-opportunity, each RF signal-of-opportunity exhibiting a different frequency within a band of interest and being perturbed by the propagation environment.

31. The method of claim 30, the method further comprising:

repeating the receiving, detecting and storing steps for each RF signal-of-opportunity at their respective different frequencies, thus providing reference data including respective signal characteristic information for each of the RF signals-of-opportunity at their respective different frequencies at the current location of the mobile receiver.

32. The method of claim 31, further comprising:

moving the mobile receiver to a plurality of locations and repeating the receiving, detecting and storing steps at each location to build the reference data to include signal characteristic information with corresponding location information for each location of the plurality of locations.

33. A location detector, comprising:

a receiver that receives a radio frequency (RF) signal-of-opportunity that exhibits a signal component at the receiver, the RF signal-of-opportunity being perturbed by a perturber within the propagation environment of the receiver, the receiver being adapted to receive the RF signal-of-opportunity within near field range of the perturber;

a signal characteristic detector that detects a signal characteristic of the signal component to provide signal characteristic information; and a comparing apparatus, responsive to the signal characteristic information, that compares the signal characteristic information with reference data to determine the current location of the receiver.

34. The location detector of claim 33, wherein the signal component is one of a horizontal polarization, a vertical polarization and a radial polarization of the RF signal-of-opportunity.

35. The location detector of claim 33, wherein the signal characteristic is a characteristic of an electric field of the RF signal-of-opportunity.

36. The location detector of claim 33, wherein the signal characteristic is a characteristic of a magnetic field of the RF signal-of-opportunity.

37. The location detector of claim 33, wherein the signal characteristic is amplitude.

38. The location detector of claim 33, wherein the RF signal-of-opportunity exhibits first and second signal components at the receiver.

39. The location detector of claim 38, wherein the signal characteristic detector detects a first signal characteristic of the first signal component and a second signal characteristic of the second signal component.

40. The location detector of claim 39, wherein the signal characteristic detector determines signal characteristic comparison information from the first and second signal characteristics.

41. A location detector adapted for calibration, comprising:
- a receiver that receives a first radio frequency (RF) signal-of-opportunity that exhibits a signal component at the receiver, the first RF signal-of-opportunity being perturbed by a perturber within the propagation environment of the receiver, the receiver being adapted to receive the RF signal-of-opportunity at a current location within near field range of the perturber;
- a signal characteristic detector that detects a signal characteristic of the signal component to provide signal characteristic information; and
- a reference data store that stores the signal characteristic information and corresponding location information designating the current location of the receiver, thus providing calibration reference data to the reference data store.

42. The location detector of claim 41, wherein the first RF signal-of-opportunity is one of a plurality of RF signals-of-opportunity, each RF signal-of-opportunity exhibiting a different frequency within a band of interest and being perturbed by the propagation environment.

43. The location detector of claim 42, wherein the location detector repeats the receiving, detecting and storing operations for each RF signal-of-opportunity at their respective different frequencies, thus providing calibration reference data including respective signal characteristic information for each of the RF signals-of-opportunity at their respective different frequencies at the current location of the receiver.

44. The location detector of claim 43, wherein the location detector moves to a plurality of locations and repeats the receiving, detecting and storing operations at each location to build the calibration reference data to include signal characteristic information with corresponding location information for each location of the plurality of locations.

45. The location detector of claim 44, wherein the location detector queries a user to determine if the user desires to perform calibration of the location detector for a propagation environment for which calibration was not previously conducted.

46. A computer program product, comprising:
- a computer readable storage medium;
- first program instructions that receive a radio frequency (RF) signal-of-opportunity that exhibits a signal component at a receiver, the RF signal-of-opportunity being perturbed by a perturber within the propagation environment of the receiver, the receiver being adapted to receive the RF signal-of-opportunity within near field range of the perturber;
- second program instructions that detect a signal characteristic of the signal component to provide signal characteristic information; and
- third program instructions that compare the signal characteristic information with reference data to determine the current location of the receiver;
- wherein the first, second, and third program instructions are stored on the computer readable storage medium.

\* \* \* \* \*